(12) United States Patent
Hoffman et al.

(10) Patent No.: US 7,460,526 B1
(45) Date of Patent: Dec. 2, 2008

(54) SYSTEM AND METHOD FOR ESTABLISHING A CARRIER VIRTUAL NETWORK INVERSE MULTIPLEXED TELECOMMUNICATION CONNECTION

(75) Inventors: Bruce Edward Hoffman, Overland Park, KS (US); Peter H. Distler, Overland Park, KS (US); Durga Prasad Satapathy, Olathe, IN (US)

(73) Assignee: Sprint Communications Company L.P., Overland Park, KS (US)

( * ) Notice: Subject to any disclaimer, the term of this patent is extended or adjusted under 35 U.S.C. 154(b) by 1132 days.

(21) Appl. No.: 10/697,396

(22) Filed: Oct. 30, 2003

(51) Int. Cl.
*H04L 12/50* (2006.01)
*H04J 3/04* (2006.01)

(52) U.S. Cl. .................. 370/357; 370/535
(58) Field of Classification Search .......... None
See application file for complete search history.

(56) References Cited

U.S. PATENT DOCUMENTS

| | | | |
|---|---|---|---|
| 6,434,156 B1 * | 8/2002 | Yeh ..................... | 370/401 |
| 6,452,924 B1 | 9/2002 | Golden | |
| 6,678,248 B1 | 1/2004 | Haddock | |
| 7,023,860 B1 | 4/2006 | Mauger | |
| 2002/0004827 A1 | 1/2002 | Ciscon | |
| 2002/0052915 A1 | 5/2002 | Amin-Salehi | |
| 2002/0174207 A1 | 11/2002 | Battou | |
| 2003/0117954 A1 | 6/2003 | De Neve et al. | |
| 2003/0123446 A1 | 7/2003 | Muirhead et al. | |
| 2003/0227915 A1 | 12/2003 | Brahim | |
| 2004/0081172 A1 | 4/2004 | Ould-Brahim | |
| 2004/0165605 A1 | 8/2004 | Nassar | |
| 2004/0181476 A1 | 9/2004 | Smith | |
| 2006/0248205 A1 | 11/2006 | Randle | |

OTHER PUBLICATIONS

Notice of Allowance in U.S. Appl. No. 10/439,590, Filed May 16, 2003, entitled "Network System Manager For Telecommunication Carrier Virtual Networks," 8 pp.*

* cited by examiner

*Primary Examiner*—Edan Orgad
*Assistant Examiner*—Sori A Aga

(57) ABSTRACT

The present invention provides a system and method for establishing an inverse multiplexed connection using layer one resources dedicated to a carrier virtual network. A plurality of links may be identified that when combined will meet the service level requirements for a connection. The plurality of links may be aggregated at their termination point. The plurality of links may be further aggregated by a carrier virtual network manager. Alternative links may be identified and aggregated if any of the plurality of links become impaired.

34 Claims, 24 Drawing Sheets

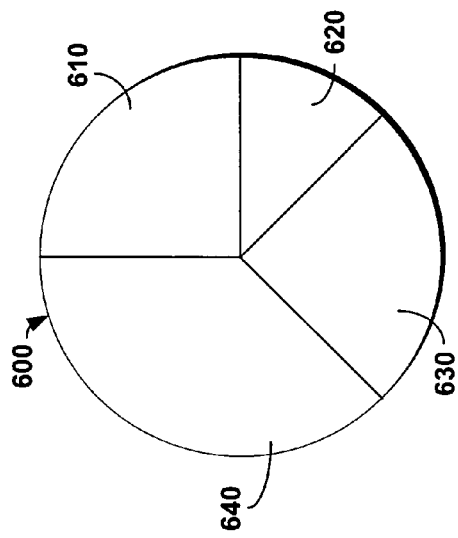
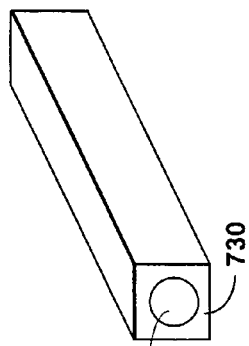
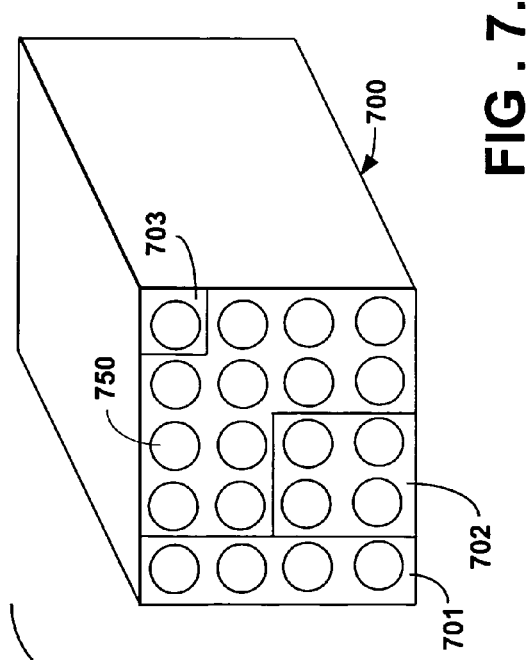
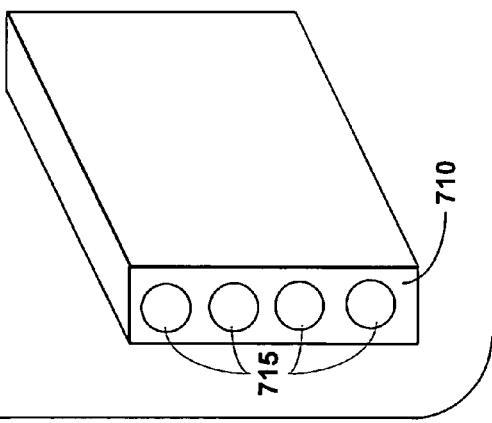
FIG. 6.
FIG. 7.

SYSTEM AND METHOD FOR ESTABLISHING A CARRIER VIRTUAL NETWORK INVERSE MULTIPLEXED TELECOMMUNICATION CONNECTION

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates to telecommunications. More particularly, the present invention relates to the establishment of carrier virtual networks to allow telecommunication service providers to access and manage secure, partitioned layer one telecommunication resources of other telecommunication service providers, and vice versa, thereby better using underutilized telecommunication resources and improving the reach and service of participating telecommunication service providers.

BACKGROUND OF THE INVENTION

The telecommunication industry in the United States, as well as abroad, faces a unique set of circumstances. The telecommunication industry as a whole suffers from an over capacity of installed telecommunication resources. Yet despite this over capacity, every telecommunication service provider, however, is exposed to service requests in specific cities, countries, or regions of the world where it has available less than adequate managed telecommunication resources to deliver the requested services to customers.

The problem of over capacity of telecommunication resources arises most markedly at layer one of the telecommunication hierarchy. Layer one telecommunication resources have been deployed beyond the level the market place presently requires and beyond the level reasonably expected to be necessary in the near future. Layer one resources are the physical resources, such as copper lines, coaxial cables, fiber circuits, wireless bandwidth, digital cross connects, optical switches, electrical switches, and other physical resources used to provide telecommunication services. At present, installed layer one telecommunication resources drastically exceed the needed resources in many areas. The excess layer one resources include completely unused resources, such as unused optical fiber typically referred to as "dark fiber." Excess layer one resources also include resources that are in use but under utilized, such as transmission facilities like optical fiber that has been "lit", meaning equipped and put in use, but that is being used at well below its possible capacity. Excess layer one resources represent a significant investment for telecommunication service providers—an investment that in many instances provides little or no return and questionable prospect of returns in the foreseeable future.

The problem of under capacity of telecommunication resources most often relates to the lack of layer one resources within particular markets or geographical areas for a particular telecommunication service provider in need of such resources to provide service to customers. While a particular telecommunication service provider's resources may be under utilized in at least some markets, the service provider may lack resources in other markets where it needs such resources to provide services to its customers. Faced with such a situation, the telecommunication service provider historically had to choose between not offering the service needed by a customer, incurring the expense of deploying additional layer one resources to service that customer, or acquiring access to unmanaged layer one resources from other telecommunication service providers with resources deployed in the market. Frequently, none of those options are desirable or available within timelines acceptable to the customer and the telecommunication service provider involved.

A decision to not provide services needed by a customer is obviously damaging to both the customer and the telecommunication service provider. Such a course leaves the customer without needed services, and the customer must then pursue alternative arrangements to meet its telecommunication needs. The telecommunication service provider that declines to provide services loses possible revenue and risks harming a customer relationship. A telecommunication customer in this situation may ultimately obtain services from multiple telecommunications providers. This can increase the total cost of telecommunication services to the customer, and will almost always increase the complexity of the customer's telecommunications operations. While few would prefer such a situation, this is often forced upon customers if a single telecommunications provider cannot provide that customer with all telecommunication services required for its various locations. Clearly, simply not providing service to a customer when a telecommunication service provider lacks the layer one resources needed to provide the service is unappealing.

It may seem that the most straight forward way for a telecommunication service provider to provide services to a customer needing services for which the service provider lacks required layer one resources is to simply physically deploy the required layer one resources. Several obstacles prevent this seemingly simple solution from being feasible in most circumstances. First, the time required to deploy the required layer one resources often far exceeds the time frame within which a customer needs the service. Second, the cost of deploying the resources often greatly exceeds the revenues likely to be received by the telecommunication service provider from the customer for the needed services. Third, once the layer one resources are deployed they are likely to be under utilized and, therefore, unprofitable for the telecommunication service provider. For these and other reasons, deploying additional layer one resources to meet a customer's service needs is frequently impractical for both the customer and the telecommunication service provider.

Given the unsatisfactory nature of simply not providing a customer a service it needs and the impracticality of deploying the layer one resources required to provide a customer a service it needs, a telecommunication service provider may seek to access the layer one resources of another telecommunication service provider to provide the customer the needed service. If, as is often the case, a telecommunication service provider has deployed layer one resources in an area, another service provider needing to provide services in that area may seek to access those excess layer one resources to provide a service to a customer. Historically, the layer one resources acquired in this fashion had no systemic management capabilities extended with them. The acquired layer one resources were, essentially, an unmanaged capacity acquisition. While understood within the industry, acquiring such access and providing service to a customer using the resources of another telecommunication service provider is not a simple task.

First, determining what layer one telecommunication resources are available to be accessed in an area and which telecommunication service provider owns those resources is generally manual in nature, process intensive, and time consuming. The network management systems of a service provider's own telecommunication network can readily identify layer one resources are available within that network, but those network management systems cannot identify the layer one resources of other service providers' that are potentially available. Often, identifying what layer one resources may be available from other telecommunication service providers may depend upon the personal knowledge of technicians in an area or a search of public records. Once possible layer one resources in another service provider's telecommunication network are identified, through whatever method, a request to access those resources must be made. After a request to access resources has been made, the telecommunication service provider that owns the requested layer one resources must determine the availability of those resources for access by the requester and determine the terms for that access. Evaluating such a request for access can be complicated by technical issues, business considerations, and extensive government regulation of the telecommunication industry. Even under the best of circumstances, evaluating and responding to a request from another telecommunication service provider to access layer one telecommunication resources can be a time consuming process.

Even if a service can ultimately be provided to a customer using another telecommunication service provider's layer one resources, the need to make individual inquiries to determine the availability of the layer one telecommunication resources of another telecommunication service provider drastically slows the process of establishing service to a customer, as the process of obtaining access must necessarily be completed before a connection can be made using those resources. The need to utilize resources from other service providers also complicates the provisioning process of the telecommunication service provider from being performed, which if not implemented properly can often be even more problematic to a customer than a delay in commencing the needed service. Provisioning refers to the process whereby a telecommunication service provider determines how to route a needed telecommunication connection, determines specific equipment (e.g. multiplexers, digital cross connect systems, etc.) and specific ports to be used, confirms available capacity end-to-end, and tests that connection before establishing it for the customer. Because the telecommunication service provider requesting access to another's layer one resources cannot access those resources and does not know what resources will be made available to it, the provisioning process cannot begin until arrangements have been made for accessing the layer one resources. Without all the information required to provision a requested connection, a telecommunication service provider cannot reliably inform a customer of the cost of the requested service, or even confirm that the requested service is possible. Thus, the customer must wait, often an indeterminate amount of time, not only for a telecommunication service to be provided, but also even for confirmation that the service is possible and what the service will cost. Indeed, difficulties such as these in even providing basic details about a requested service contribute to an unflattering caricature of telecommunication service providers. At a minimum, this delay and uncertainty frustrates customers and interferes with their business.

The result of the above described situation is problematic for both telecommunication service providers and their customers. Despite a general over capacity, even a glut, of deployed layer one telecommunication resources, the resources needed to provide services needed by customers are often not readily available when needed by a particular service provider in a particular market. While an under utilized high bandwidth capacity fiber may be proximate to a customer location, that fiber is often operated by another service provider, one that is not the customer's choice to meet its telecommunication needs. Simply switching to a different telecommunication service provider will often only change the location of the problem, as all telecommunication service providers suffer from limited reach in some areas and markets. As business and life increasingly become global, the problem of limited reach becomes increasingly problematic, with customers needing telecommunication services not only in multiple regions of one country, but also in multiple countries and even multiple continents. Thus, a customer faces a host of mostly access-limited telecommunication service choices, and telecommunication service providers struggle with the paradoxical twin dilemmas of simultaneous over capacity and under capacity of layer one telecommunication resources.

The need exists, therefore, for a system and method for allowing telecommunication providers to quickly, reliably, and conveniently access and manage the under utilized layer one resources of other telecommunication service provider's networks. Such a system should preferably allow for the easy provisioning of a connection and should be transparent to the ultimate customer.

BRIEF SUMMARY OF THE INVENTION

The present invention establishes a carrier virtual network that extends the effective reach of telecommunication service providers' networks and allows for the use of under utilized and unutilized layer one telecommunication resources of other service providers' networks. A carrier virtual network in accordance with the present invention allows a telecommunication network to access in a systemically managed manner the layer one resources of another telecommunication network to provide telecommunication services. The carrier virtual network in accordance with the present invention may be established by dedicating one or more portions of the layer one telecommunication resources of a telecommunication network to the carrier virtual network. Thereafter, the layer one resources dedicated to the carrier virtual network may be systemically accessed by a telecommunication service provider that may access the carrier virtual network as if those layer one resources were part of the service provider's own telecommunication network. In a similar fashion, portions of layer one resources from multiple telecommunication networks may be dedicated to a single carrier virtual network.

BRIEF DESCRIPTION OF THE SEVERAL VIEWS OF THE DRAWINGS

The present invention is described in detail below with reference to the attached drawing figures, wherein;

FIG. 6 is a schematic illustration of the dedication of portions of layer one resources to carrier virtual networks;

FIG. 7 is a schematic illustration of the dedication of a layer one device to a carrier virtual network;

DETAILED DESCRIPTION OF THE INVENTION

Figure 1:
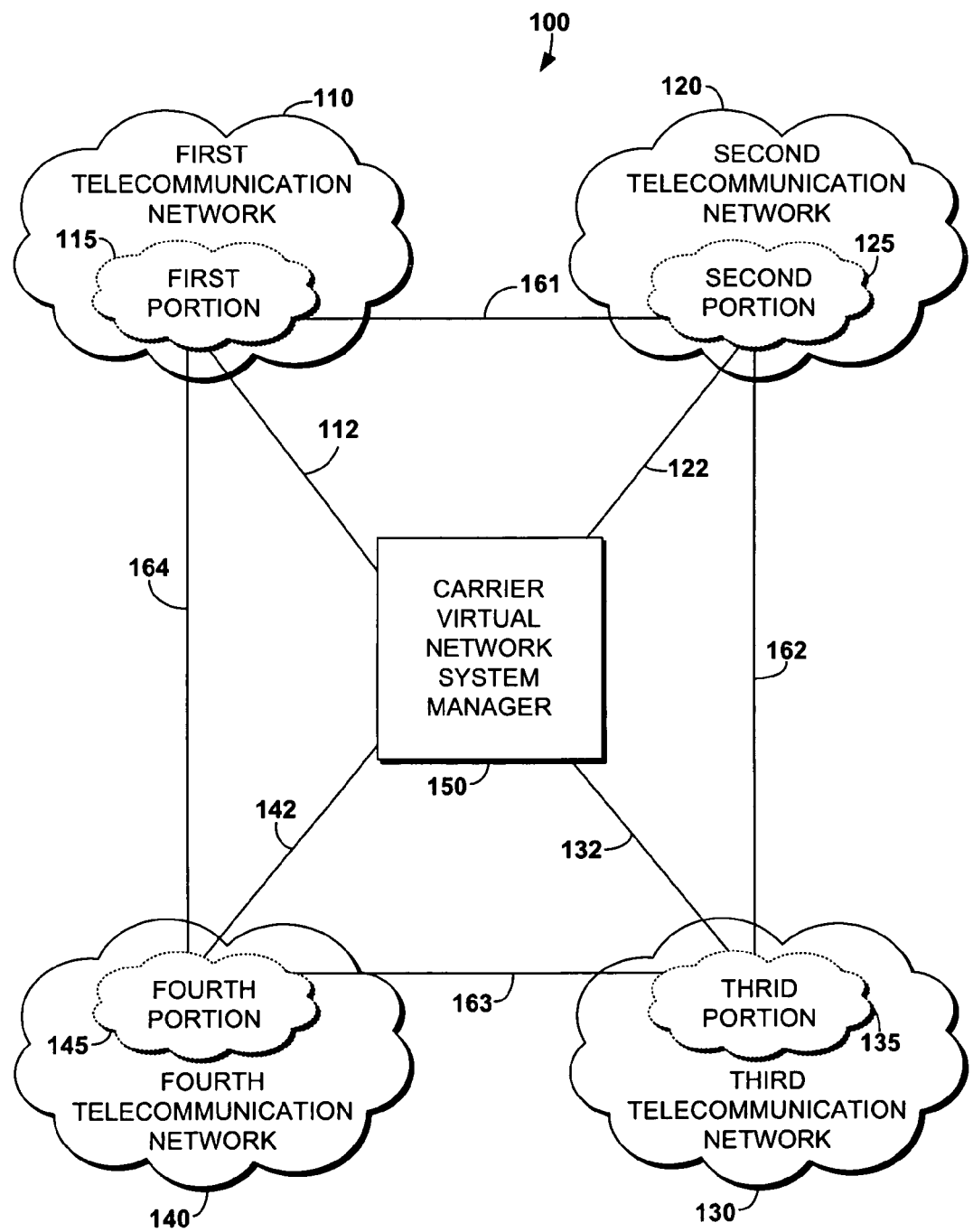
FIG. 1 is a schematic illustration of a carrier virtual network comprised of portions of layer one resources dedicated to the carrier virtual network from four telecommunication networks.

The present invention allows unutilized or under utilized layer one telecommunication resources of one telecommunication network to be accessed and securely managed by another telecommunication network by creating carrier virtual networks. A carrier virtual network is a network of shared layer one telecommunication resources that are logically divided into discreet networks for different users. Telecommunication networks are often envisioned in various layers, with layer one being the layer of actual hardware, such as cables, optical/electrical switches, and add/drop multiplexers, with ascending layers representing communications protocols and, ultimately, the users of the network.

In accordance with the present invention, a portion of the layer one resources of a telecommunication network are dedicated to a carrier virtual network that may be accessed and managed by another telecommunication provider. While the layer one resources dedicated to a carrier virtual network may be expected to be excess layer one resources, this need not be the case.

One simple arrangement of a carrier virtual network in accordance with the present invention that is useful for illustrative purposes involves two telecommunication networks of different geographical scope. A portion of the layer one resources of each of the telecommunication networks are dedicated to a partitioned carrier virtual network that may be accessed and securely managed by the other telecommunication service provider. In this scenario, each telecommunication service provider would expand the geographical scope of services it could offer, without the cost and uncertainty of physically deploying additional layer one resources.

Of course, implementations of the present invention are likely to vary considerably from the basic example above. For example, one telecommunication service provider may enter into arrangements to create a carrier virtual network with multiple telecommunication networks owned by other telecommunication service providers. In this instance, the first telecommunication service provider would effectively expand its telecommunication network to include portions of the layer one resources of multiple other telecommunication networks. Thus, multiple portions of layer one resources from multiple telecommunication networks are combined into a single carrier virtual network that maybe accessed by a single telecommunication network.

Another possible scenario is the creation of pooled layer one resources from multiple telecommunication networks. These resources would be assigned to a non-dedicated carrier virtual network pool that would be accessible for acquisition by all carrier virtual network service providers' customers. In this scenario, a portion of the layer one resources of each telecommunication network is dedicated to a single carrier virtual network accessible by telecommunication networks that dedicated layer one resources to the carrier virtual network. Alternately, access to the pooled layer one resources dedicated to the carrier virtual network may be granted to telecommunication networks that do not contribute resources to the pool in exchange for suitable access fees.

It should be noted that the process whereby telecommunication service providers agree to form carrier virtual networks in accordance with the present invention is immaterial. Likewise, how telecommunication service providers participating in a carrier virtual network allocated access rights is immaterial to the present invention. Telecommunication service providers may pursue arrangements to establish and maintain carrier virtual networks in any fashion without departing from the scope of the present invention.

A carrier virtual network in accordance with the present invention may facilitate the provisioning of a service for a customer by establishing the network availability prior to the placement of an order by a customer. For example, a first telecommunication service provider and a second telecommunication service provider may form carrier virtual networks allowing each to access a portion of the other's layer one resources. At the formation of the network, and possibly at subsequent times, each service provider would identify to the other those layer one resources in its own telecommunication network that are dedicated to the carrier virtual network accessible to the other network. This process of identifying layer one resources that are dedicated to the carrier virtual network may involve providing to the network system manager of the other telecommunication network information regarding the portion of layer one resources dedicated to the carrier virtual network to enable the other telecommunication service provider to manage those resources as if they were part of its own network. The layer one resources dedicated to the carrier virtual network would appear to customers and those performing provisioning for the telecommunication service provider as portions of its own telecommunication network. Accordingly, a participating telecommunication service provider could immediately ascertain whether a particular customer request can be fulfilled using the carrier virtual network, without having to engage the second telecommunication service provider to determine whether it will provide access to its layer one resources in an acceptable fashion. These and other broad aspects of the present invention are further illustrated in the attached figures.

Referring now to FIG. 1, a schematic diagram of a carrier virtual network comprised of portions of layer one resources dedicated to the carrier virtual network from four telecommunication networks is illustrated. A first telecommunication network 110 dedicates a first portion 115 of layer one resources to the carrier virtual network. A second telecommunication network 120 dedicates a second portion 125 of its layer one resources to the carrier virtual network. A third telecommunication network 130 dedicates a third portion 135 of layer one resources to the carrier virtual network. A fourth telecommunication network 140 dedicates a fourth portion 145 of layer one resources to the carrier virtual network. A first network connection 161 links the first telecommunication network 110 and the first portion 115 to the second telecommunication network 120 and the second portion 125. A second network connection 162 links the second telecommunication network 120 and the second portion 125 to the third telecommunication network 130 and the third portion 135. A third network connection 163 links the third telecommunication network 130 and the third portion 135 to the fourth telecommunication network 140 and the fourth portion 145. A fourth network connection 164 links the fourth telecommunication network 140 and the fourth portion 145 to the first telecommunication network 110 and the first portion 115. The first network connection 161, the second network connection 162, the third network connection 163, and the fourth network connection 164 are means that allow a telecommunication network that may access the carrier virtual network to access portions of layer one resources dedicated to the carrier virtual network. While the first network connection 161, the second network connection 162, the third network connection 163, and the fourth network connection 164 may often be a high bandwidth optical fiber, any other type of connection, including wireless, may be used. It should be noted that multiple network connections and parts of the carrier virtual network itself may constitute a means for a telecommunication network to access a portion of layer one resources dedicated to a carrier virtual network. For example, as shown in FIG. 1 the first telecommunication network 110 may access the third portion 135 using the first network connection 161, the second network connection 162, and an appropriate connection formed through the second portion 125. Further, it should be realized that more network connections than the four illustrated in FIG. 1 may be employed, and that those network connections may connect any telecommunication network with access to the carrier virtual network to any portion of layer one resources dedicated to the carrier virtual network.

The first telecommunication network 110 and the portion 115 dedicated to the carrier virtual network are connected to a carrier virtual network system manager 150 through a first dedicated connection 112. The second telecommunication network 120 and the second portion 125 dedicated to the carrier virtual network are connected to carrier virtual network system manager 150 through a second dedicated connection 122. The third telecommunication network 130 and the third portion 135 dedicated to the carrier virtual network are connected to the carrier virtual network system manager 150 through a third dedicated connection 132. The fourth telecommunication network 140 and the fourth portion 145 dedicated to the carrier virtual network are connected to the carrier virtual network system manager 150 through a fourth dedicated connection 142.

The carrier virtual network system manager 150 maintains information regarding the layer one resources dedicated to the carrier virtual network. For example, the carrier virtual network system manager 150 maintains information identifying the layer one resources of the first portion 115, the second portion 125, the third portion 135, and the fourth portion 145. As shall be described more fully below, the carrier virtual network system manager 150 interfaces with participating telecommunication networks to receive information regarding the layer one resources dedicated to the carrier virtual network from networks dedicating those resources and to provide that information to the telecommunication networks that may access the carrier virtual network. Additional aspects of various embodiments of a carrier virtual network system manager 150 will be discussed below. A carrier virtual network may be established and maintained without the use of a carrier virtual network system manager 150 by, for example, directly exchanging information regarding the portions of layer one resources dedicated to a carrier virtual network between telecommunication networks. If the carrier virtual network system manager 150 is omitted, the network system managers that manage each participating telecommunication network may transmit and receive information regarding the portions of layer one resources dedicated to the carrier virtual network. However, differences between the network system managers of different telecommunication networks may hamper the exchange of such information. Also, network system managers may not be designed to exchange such information. For these reasons, the use of a carrier virtual network system manager may facilitate the establishment and maintenance of a carrier virtual network.

Figure 2:
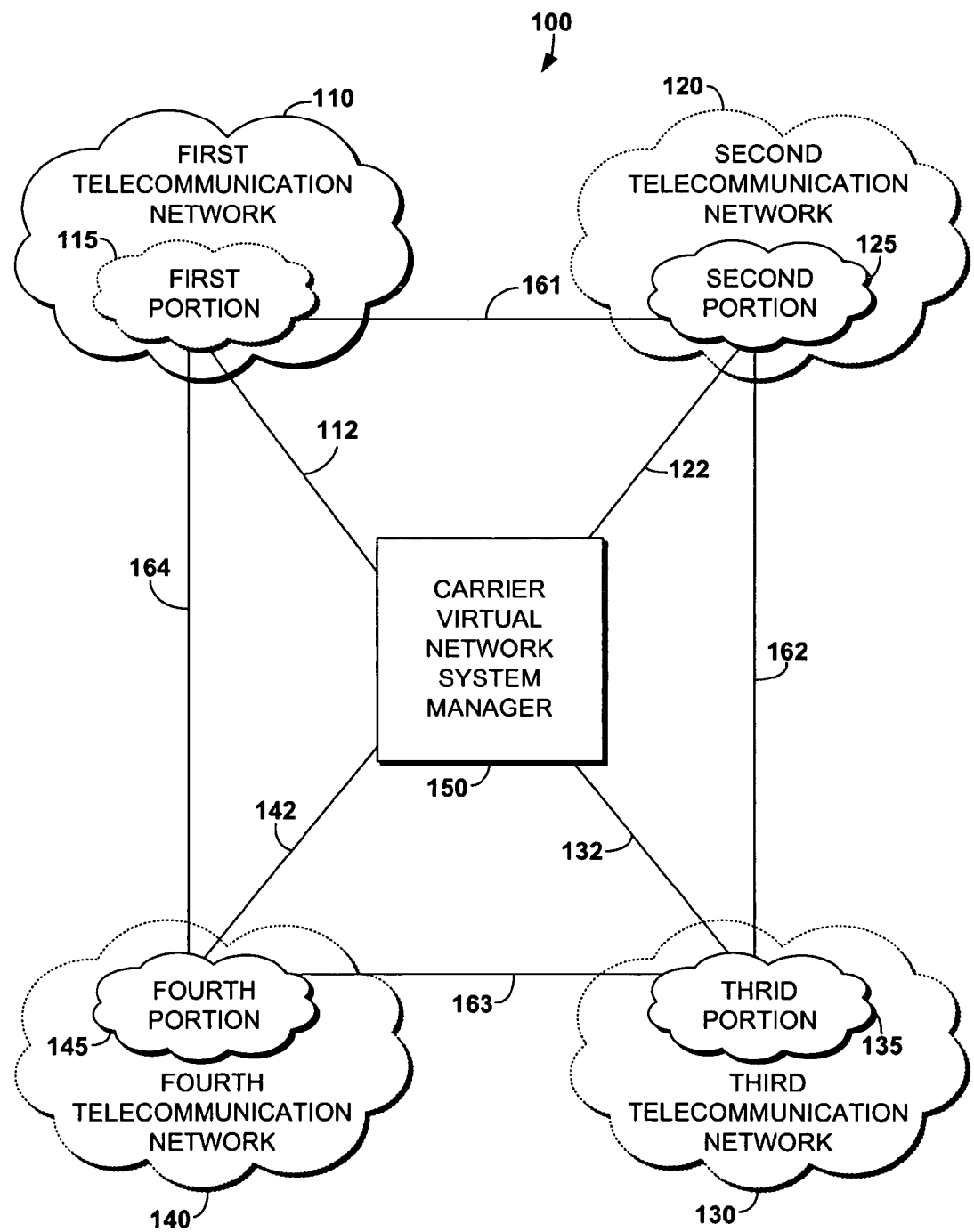
FIG. 2 is a schematic illustration of the apparent network available to a user of a telecommunication network by accessing layer one resources dedicated to a carrier virtual network.

Referring now to FIG. 2, the apparent network available to a user of the first telecommunication network 110 is illustrated. The customer wishing to utilize the resources of the first telecommunication network would, of course, have available to it the resources of the first telecommunication network 110. However, because of the carrier virtual network the customer may receive services using the second portion 125 of the second telecommunication network 120, the third portion 135 of the third telecommunication network 130, and the fourth portion 145 of the fourth telecommunication network 140. From the perspective of a customer using the first telecommunication network 110, or for the first telecommunication service provider provisioning an order from a customer, the first telecommunication network 110 includes the additional layer one network resources made available to it via the carrier virtual network. The situation is similar for the second telecommunication network 120, the third telecommunication network 130, and the fourth telecommunication network 140, each of which is able to expand its available resources to include the portions of the other telecommunication networks dedicated to the carrier virtual network.

In further reference to FIG. 1 and FIG. 2, it should be understood that the first telecommunication network 110, the second telecommunication network 120, the third telecommunication network 130, and the fourth telecommunication network 140 may be, at least in part, geographically coextensive. For example, any number of telecommunication networks involved in a carrier virtual network may serve a given market or geographical area. It should also be appreciated that FIG. 1 and FIG. 2 illustrate the present invention schematically at a high level. The specific layer one resources dedicated to a carrier virtual network are not illustrated, and could include any layer one resources in a telecommunication network. For example, layer one resources dedicated to a carrier virtual network in accordance with the present invention may include, but are not limited to, telecommunication cable, telecommunication optical/electrical switches, telecommunication digital cross connect routers, and mobile telecommunication bandwidth. Of course, not every possible layer one resource need be included in any given carrier virtual network in accordance with the present invention.

Figure 3:
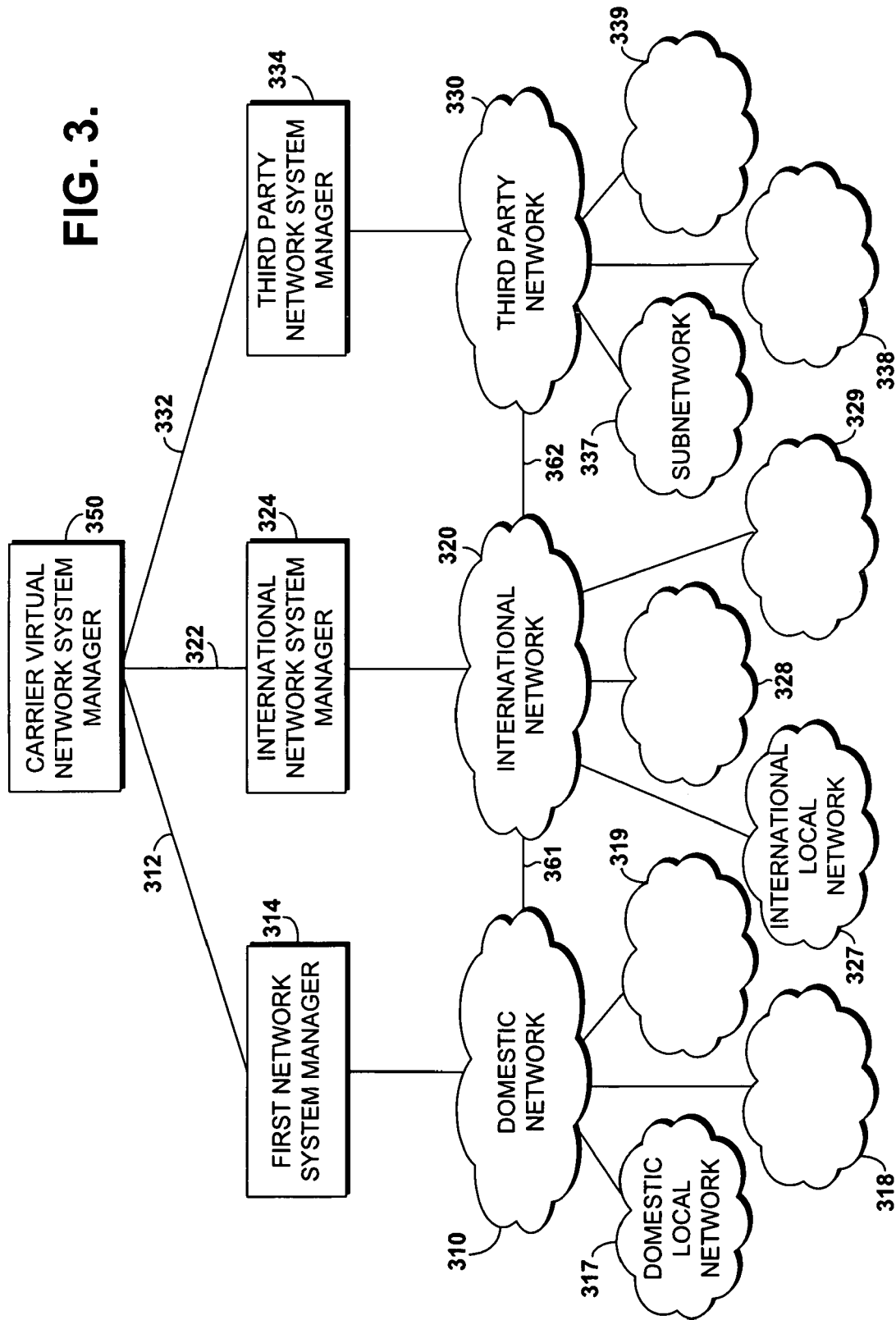
FIG. 3 is a schematic illustration of one possible arrangement of telecommunication networks in a carrier virtual network.

Referring now to FIG. 3, one possible arrangement of telecommunication networks involved in a carrier virtual network in accordance with the present invention is illustrated schematically. For illustrative purposes, FIG. 3 illustrates a carrier virtual network with three participating telecommunication networks: a domestic telecommunication network 310, an international telecommunication network 320, and a third party telecommunication network 330. The characterization of the participating telecommunication networks illustrated in FIG. 3 as "domestic", "international", and "third party" are for illustrative purposes only and are immaterial to the formation of the carrier virtual network. The number and types of telecommunication networks involved in a carrier virtual network may vary from those described in conjunction with and illustrated in FIG. 3.

The carrier virtual network system manager 350 receives, maintains, and provides information regarding which layer one resources are dedicated to the carrier virtual network. The carrier virtual network system manager 350 exchanges information regarding the layer one resources available with the network system managers of the participating telecommunication networks. A first dedicated connection 312 between carrier virtual network system manager 350 and the first network system manager 314 of the domestic network 310 allows for the exchange of information regarding the layer one resources dedicated to the carrier virtual network. The first network system manager 314 may be a system of the type referred to in the art as an OSS or a BSS, as may the other network system managers discussed herein. One or more of the network system managers may also be a carrier virtual network application manager. A second dedicated connection 322 between carrier virtual network system manager 350 and the international network system manager 324 likewise allows for the exchange of information regarding the layer one resources dedicated to the carrier virtual network. A third dedicated connection 332 between the third party network system manager 334 and the carrier virtual network system manager 350 likewise allows for the exchange of information regarding the layer one resources dedicated to the carrier virtual network. The first dedicated connection 312, second dedicated connection 322, and third dedicated connection 332 may be web based connections.

The first network system manager 314 manages domestic network 310. Domestic network 310 may connect to other networks, which may be networks accessed through domestic network 310, such as domestic local network 317, domestic local network 318, and domestic local network 319. A second network system manager 324 may manage international network 320. Other networks may likewise be accessed through international network 320, such as international local network 327, international local network 328, and international local network 329. The third party network 330 may be domestic, international, or any other type of telecommunication network, and may be managed by the third network system manager 334. Other networks may be accessed through third party network 330, such as subnetwork 337, subnetwork, 338, and subnetwork 339.

Dedicated connection 312 allows the first network system manager 314 and carrier virtual network system manager 350 to exchange information regarding the portions of layer one resources dedicated to the carrier virtual network, as well as which portions of international network 320 and third party network 330 have been dedicated to the carrier virtual network. First network system manager 314 can then access layer one resources of international network 320 and third party network 330 dedicated to the carrier virtual network for establishing a connection or provisioning a connection via network connection 361 and network connection 362. The second network system manager 324 and the third party network system manager 334 likewise exchange information with the carrier virtual network system manager 350 regarding the portions of layer one resources dedicated to the carrier virtual networks using the second dedicated connection 322 and the third dedicated connection 332 and use network connection 361 and network connection 362 to access layer one resources of other networks dedicated to the carrier virtual network to provision and establish connections.

Figure 4:
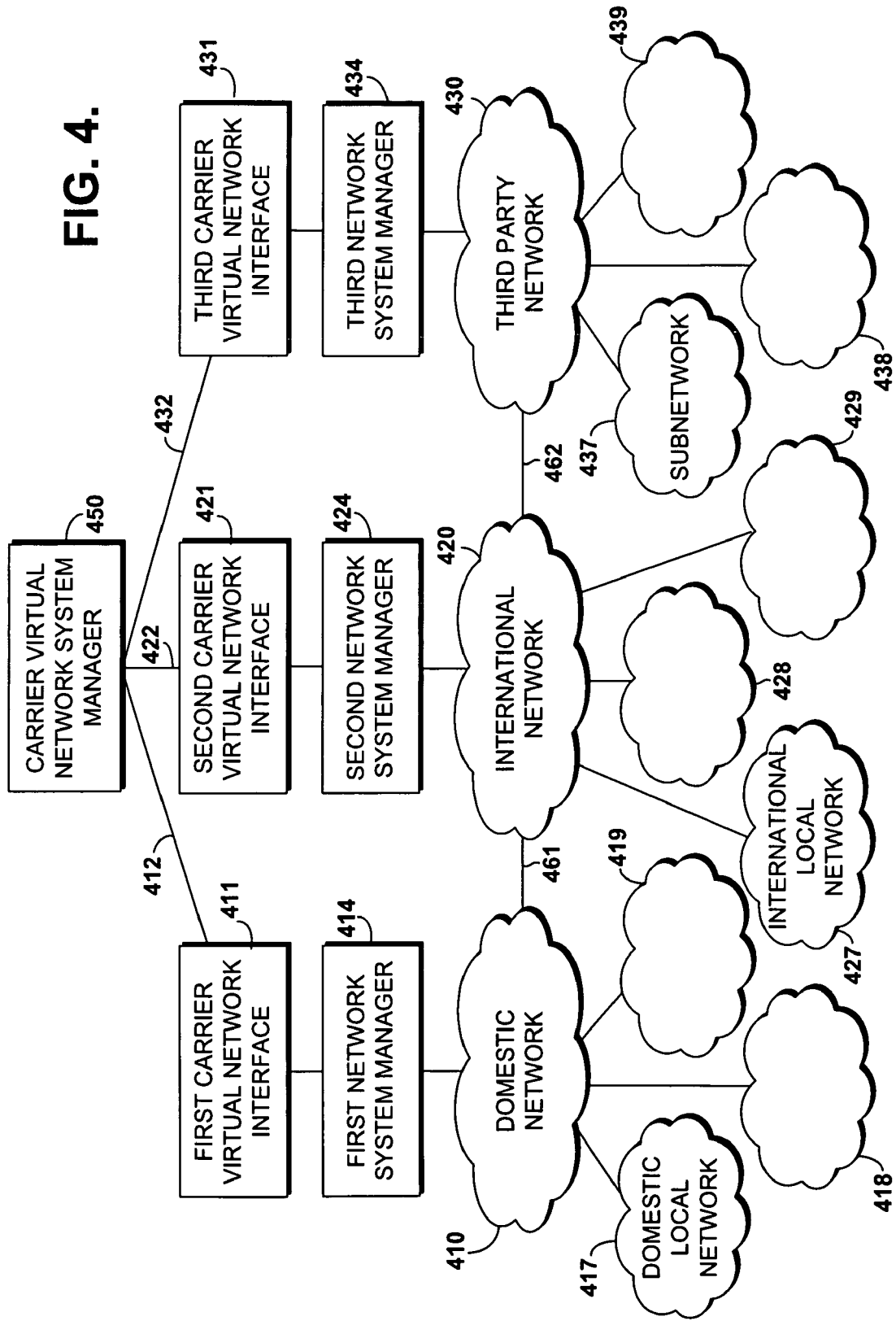
FIG. 4 is a schematic illustration of one possible arrangement of telecommunication networks in a carrier virtual network.

Referring to FIG. 4, another possible arrangement of telecommunication networks participating in a carrier virtual network is illustrated schematically. A domestic network 410 may connect to other networks, which may be networks accessed through the domestic network 410, such as domestic local network 417, domestic local network 418, and domestic local network 419. A first network system manager 414 may manage domestic network 410. A second network system manager 424 manages international network 420. Other networks may be accessed through international network 420, such as international local network 427, international local network 428, and international local network 429. A third network system manager 434 may manage third party network 430. Other networks may be accessed through third party network 430, such as subnetwork 437, subnetwork 438, and subnetwork 439.

As shown in FIG. 4, a first carrier virtual network interface 411 is interposed between carrier virtual network system manager 450 and the first network system manager 414. Dedicated connection 412 allows the first carrier virtual network interface 411 to exchange information regarding the portions of layer one resources dedicated to a carrier virtual network. Likewise, a second carrier virtual network interface 421 is interposed between carrier virtual network system manager 450 and the second network system manger 424, and a third carrier virtual network interface 431 is interposed between the carrier virtual network system manager 450 and the third network system manager 434. The second carrier virtual network interface 421 and the third carrier virtual network interface 431 exchange information with the carrier virtual network system manager 450 regarding the portions of layer one resources dedicated to carrier virtual networks using the second dedicated connection 422 and the third dedicated connection 432. The third carrier virtual network interface 431, second carrier virtual network interface 421, and first carrier virtual network interface 411 provide an interface between the carrier virtual network system manager 450 and the respective network system manager 434, 424, 414 in the exchange of information regarding the layer one resources dedicated to a carrier virtual network.

The interoperability function provided by the interfaces 411, 421, 431 may be outsourced to the third parties as well, thus representing a separate logic element in the high level architecture shown in FIG. 4. The use of carrier virtual network interfaces 411, 421, 431 to provide an interface between the carrier virtual network system manager 450 and network system managers 414, 424, 434 that manage the participating telecommunication networks 410, 420, 430 can be useful for a variety of reasons. Differences in network system managers of different telecommunication networks, such as different protocols and different communication standards, may render direct connections between the carrier virtual network system manager and the network system managers difficult. The use of carrier virtual network interfaces between the carrier virtual network system manager 450 and the various network system managers 414, 424, 434 allows the carrier virtual network system manager 450 to operate in a standardized fashion, with individual carrier virtual network interfaces 411, 421, 431 converting information for exchange between the carrier virtual network system manager 450 and the network system managers 414, 424, 434. In some instances, a network system manager 414, 424, 434 may be able to exchange information directly with the carrier virtual network system manager 450, in which case a carrier virtual network interface 411, 421, 431 may be omitted. The function of the carrier virtual network interface 411, 421, 431 may also be performed by the carrier virtual network system manager 450 or the network system manager 414, 424, 434 of participating telecommunication networks 410, 420, 430.

Figure 5:
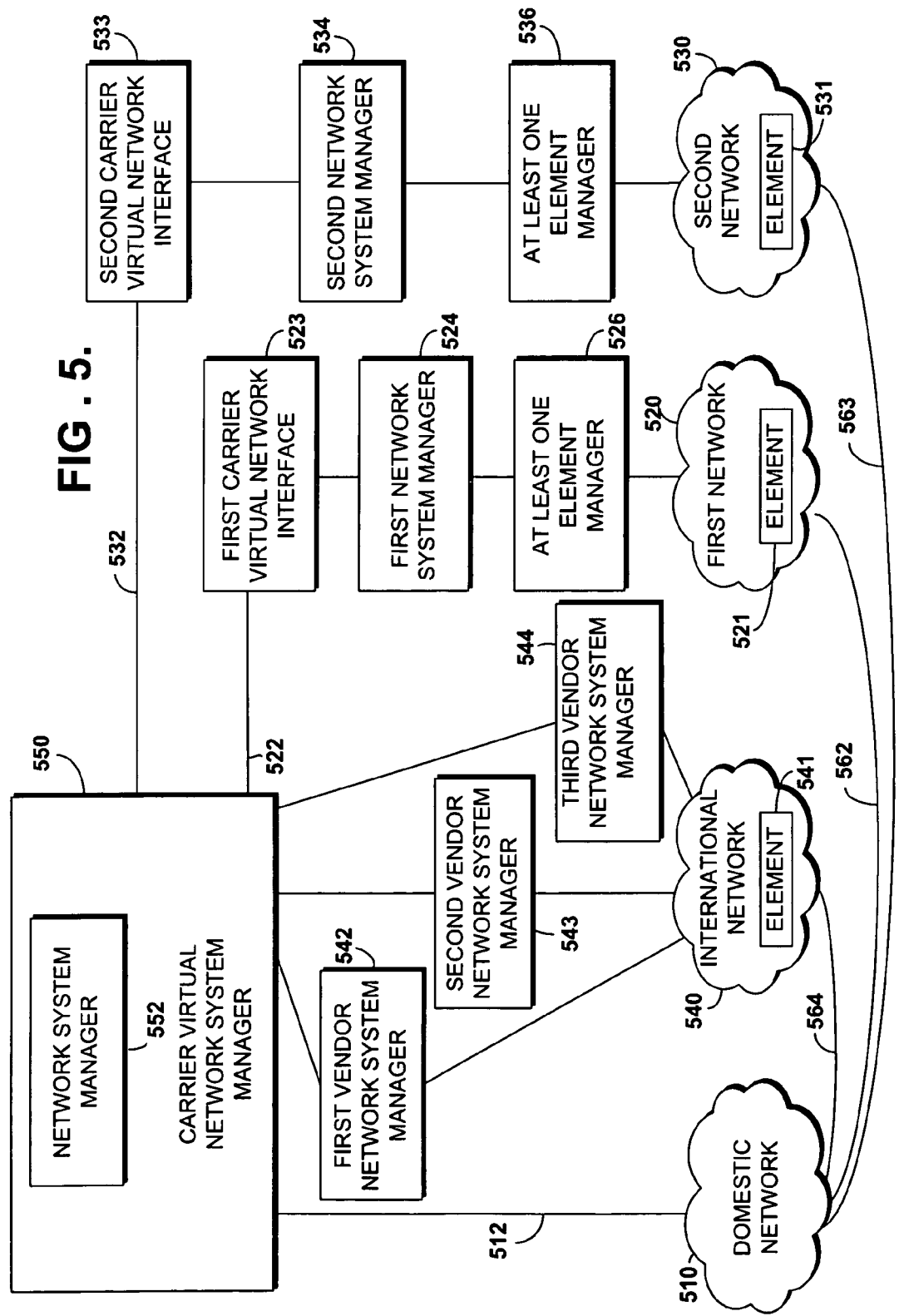
FIG. 5 is a schematic illustration of one possible arrangement of telecommunication networks in a carrier virtual network.

Referring now to FIG. 5, another possible arrangement of telecommunication networks participating in a carrier virtual network in accordance with the present invention is illustrated. The carrier virtual network system manager 550 may include within it the functionality of network system manager 552, thereby eliminating the need for a separate network system manager as illustrated in FIG. 3 and FIG. 4. The network system manager functionality 552 may be of any variety, such as an OSS/BSS, a legacy system manager or a different type of system manager. The carrier virtual network system manager 550 may include any number, including zero, network system manager functionalities of any number and combination of types. Furthermore, some participating telecommunication systems may be managed by network system manager functionality incorporated into the carrier virtual network system manager 550 while other participating telecommunication networks are managed by their own network system managers that exchange information with the carrier virtual network system manager 550.

A first dedicated connection 522 links the carrier virtual network system manager 550 to a first carrier virtual network interface 523. The first carrier virtual network interface 523 connects to a first network system manager 524, which then connects to at least one element manager 526 that controls particular elements of the first network 520, such as layer one resources dedicated to the carrier virtual network, for example element 521. A second dedicated connection 532 connects the carrier virtual network system manager 550 to a second carrier virtual network interface 533. The second carrier virtual network interface 533 connects to a second network system manager 534, which then connects to at least one element manager 536 that controls particular elements of the second network 530, such as layer one resources dedicated to the carrier virtual network, for example element 531. Element 521 and element 531 may be any layer one resource dedicated to the carrier virtual network. The components and their arrangement shown in FIG. 5 are illustrative only. Additional components beyond those shown in FIG. 5 may be used, and components shown in FIG. 5 may be omitted without departing from the scope of the invention.

As illustrated in FIG. 5, a domestic network 510 may access layer one resources dedicated to the carrier virtual network. Domestic network 510 connects to the carrier virtual network system manager 550 through dedicated connection 512 and is managed by the network system manager functionality 552 incorporated in the carrier virtual network system manager 550.

An international network 540 may connect to the carrier virtual network system manager 550 through a first vendor network system manager 542, a second vendor network system manager 543, and a third vendor network system manager 544. Each vendor network system manager may be used to manage equipment in the network 540 produced by that vendor. Accordingly, any number of vendor network managers may be used. The international network 540 may be managed as a whole by system manager functionality 552 of carrier virtual network system manager 550, or separate management systems may be used. A portion of the layer one resources of the international network 540, for example element 541, may be dedicated to the carrier virtual network. Element 541 may be any layer one resource dedicated to the carrier virtual network.

A network connection 564 connects domestic network 510 to international network 540, a network connection 562 connects domestic network 510 to first telecommunication network 520, and a network connection 563 connects domestic network 510 to the second telecommunication network 530. Domestic network 510 may access the portions of layer one resources dedicated to the carrier virtual network such as element 521, element 531, and element 541 using network connection 562, network connection 563, and network connection 564 respectively.

Referring now to FIG. 6, an example of the dedication of a layer one telecommunication resource to a carrier virtual network is illustrated. The layer one resource 600 may be any layer one resource used to provide telecommunication services, such as a high bandwidth optical fiber or other resource used in the transmission, optical, switching, and connection of telecommunication signals. As illustrated in FIG. 6, a single layer one resource may sometimes be dedicated to more than one carrier virtual network. A first portion 610 of the resource 600 may be reserved for a first use. For example, first portion 610 of resource 600 may be retained for the use of the telecommunication service provider that owns resource 600, meaning that first portion 610 will not be available to a carrier virtual network. A second portion 620 may be dedicated to a first carrier virtual network. A third portion 630 may be dedicated to a second carrier virtual network, while a fourth portion 640 may be dedicated to a third carrier virtual network. The number of portions that a layer one resource 600 is divided into is immaterial to the present invention. A layer one resource 600 may be dedicated in its entirety to a single carrier virtual network, it may be split in any technically feasible proportion between the owner of the resource 600 and a carrier virtual network, it may be split among multiple carrier virtual networks, or it may be split between carrier virtual networks and other uses. Some layer one resources may be capable of any number of divisions, while other layer one resources, such as a digital access cross-connect system ("DACS") with a finite, integral number of available ports, may be divisible only within certain parameters.

Referring now to FIG. 7, the allocation of ports of a particular resource, in this case a DACS 700, is illustrated. The DACS 700 includes a finite integral number of ports, such as port 750. A first portion 701 of the DACS 700 is dedicated to a first carrier virtual network. A second portion 702 of the DACS 700 is dedicated to a second carrier virtual network, and third portion 703 of the DACS 700 is dedicated to a third carrier virtual network. The telecommunication networks with access to the carrier virtual networks to which portions of the DACS 700 are dedicated may receive information regarding the DACS 700 in a variety of ways, such as the use of dedicated connections and a carrier virtual network system manager as described above. To the first carrier virtual network the DACS 700 appears to be a single DACS 710 with the ports 715 available to the first carrier virtual network. To the second carrier virtual network the DACS 700 appears to be a DACS 720 with the ports 725 allocated to the second carrier virtual network. To the third carrier virtual network the DACS 700 appears to be a DACS 730 with only the port 735 allocated to it. In each case, the ports allocated to a given carrier virtual network would appear as resources available to users of that carrier virtual network. As discussed above, this facilitates the provisioning of customer requests and the establishment of customer requested services. While FIG. 7 illustrates specific ports being allocated to the carrier virtual networks, it should be appreciated that in actual practice the ports allocated to a carrier virtual network may not be contiguous and, in fact, may not be constant, instead referring to a particular number of ports on a particular device that are dedicated to a carrier virtual network, not particular and individual ports within that device that are dedicated to a carrier virtual network.

Figure 8:
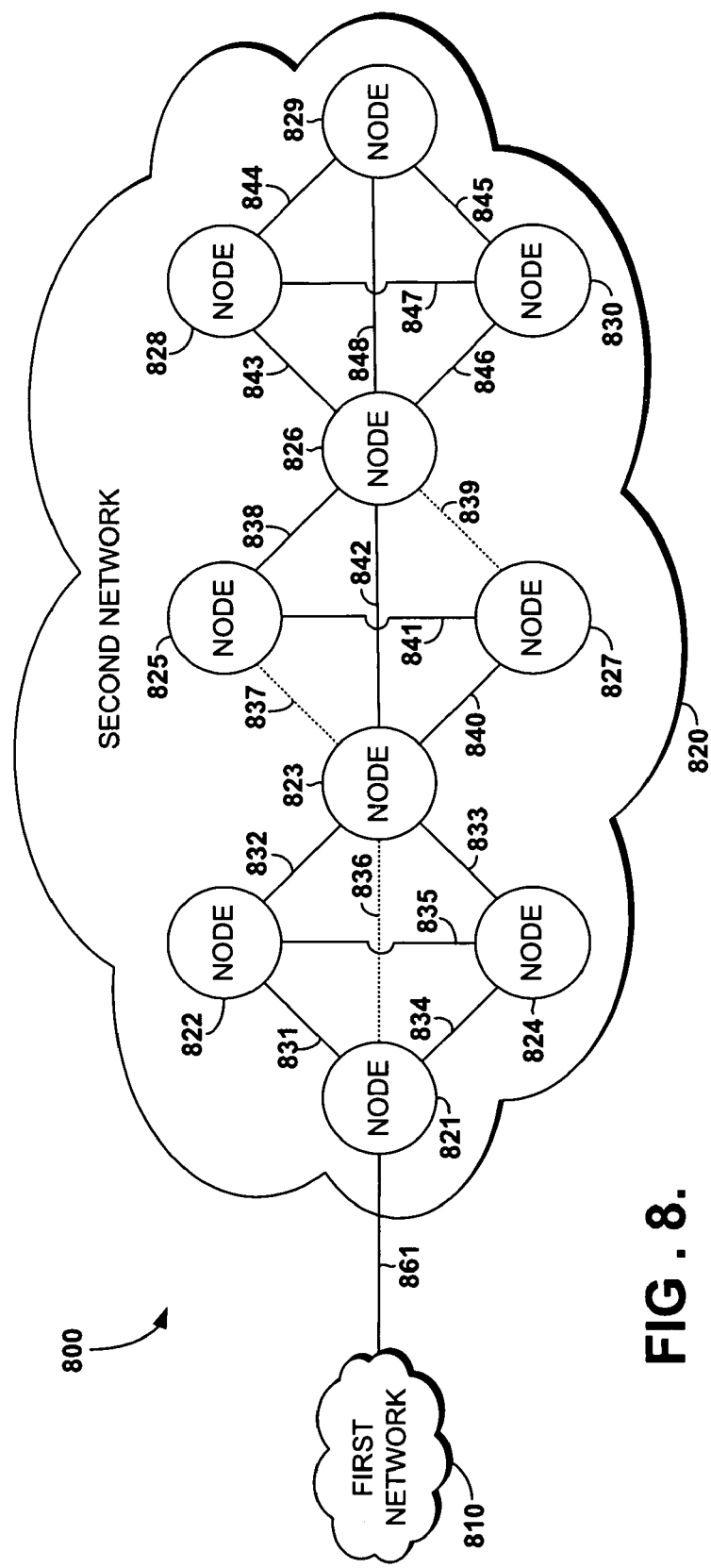
FIG. 8 is a schematic illustration of the dedication of portions of layer one resources of a telecommunication network to a carrier virtual network.

Referring now to FIG. 8, the allocation of layer one resources to a carrier virtual network 800 is illustrated. A first network 810 and a second network 820 are linked by network connection 861. While not illustrated in FIG. 8, suitable means to exchange information regarding the portions of layer one resources dedicated to a carrier virtual network, such as a carrier virtual network system manager and dedicated connections, may be used to identify the layer one resources of the second network 820 dedicated to the carrier virtual network to the first telecommunication network 810. Layer one telecommunication resources of the second network 820 may be dedicated in varying proportions to the carrier virtual network. For example, connection 831, connection 832, connection 833, connection 840, and connection 845 may be dedicated to the carrier virtual network at a first level of access. Ports on nodes, including ports on node 822, node 823, and node 830 may likewise be dedicated to the carrier virtual network at a first level of access. The first level of access may be, for example, a minimum available bandwidth. Other layer one resources may be dedicated to the carrier virtual network at a second level of access, for example connection 835, connection 838, connection 842, connection 843, connection 844, as well as ports on node 824, node 826, and node 828. The second level of access may be, for example, a second minimum available bandwidth. Additional layer one resources may be dedicated to the carrier virtual network at a third level of access, for example connection 834, connection 841, connection 846, connection 848, as well as ports on node 821, node 825, node 827, and node 829. The third level of access may be, for example, a third minimum available bandwidth. Not all layer one resources of the second network 820 need be dedicated to the carrier virtual network. Examples of layer one resources not dedicated to the carrier virtual network, may be, for example connection 836, connection 837, connection 839 and connection 847. Layer one resources of the second network 820 that are not dedicated to the carrier virtual network are not accessible to the first network 810 through the carrier virtual network for purposes such as establishing a connection for a customer or provisioning a customer request. Layer one resources of the second network 820 that are dedicated to the carrier virtual network are accessible to the first telecommunication network 810 for purposes such as establishing a customer connection and provisioning a customer request. It should be further noted that layer one resources within the first network 810 may be likewise dedicated to a carrier virtual network that may be accessed by the second network 820, although that is not illustrated in FIG. 8.

Figure 9:
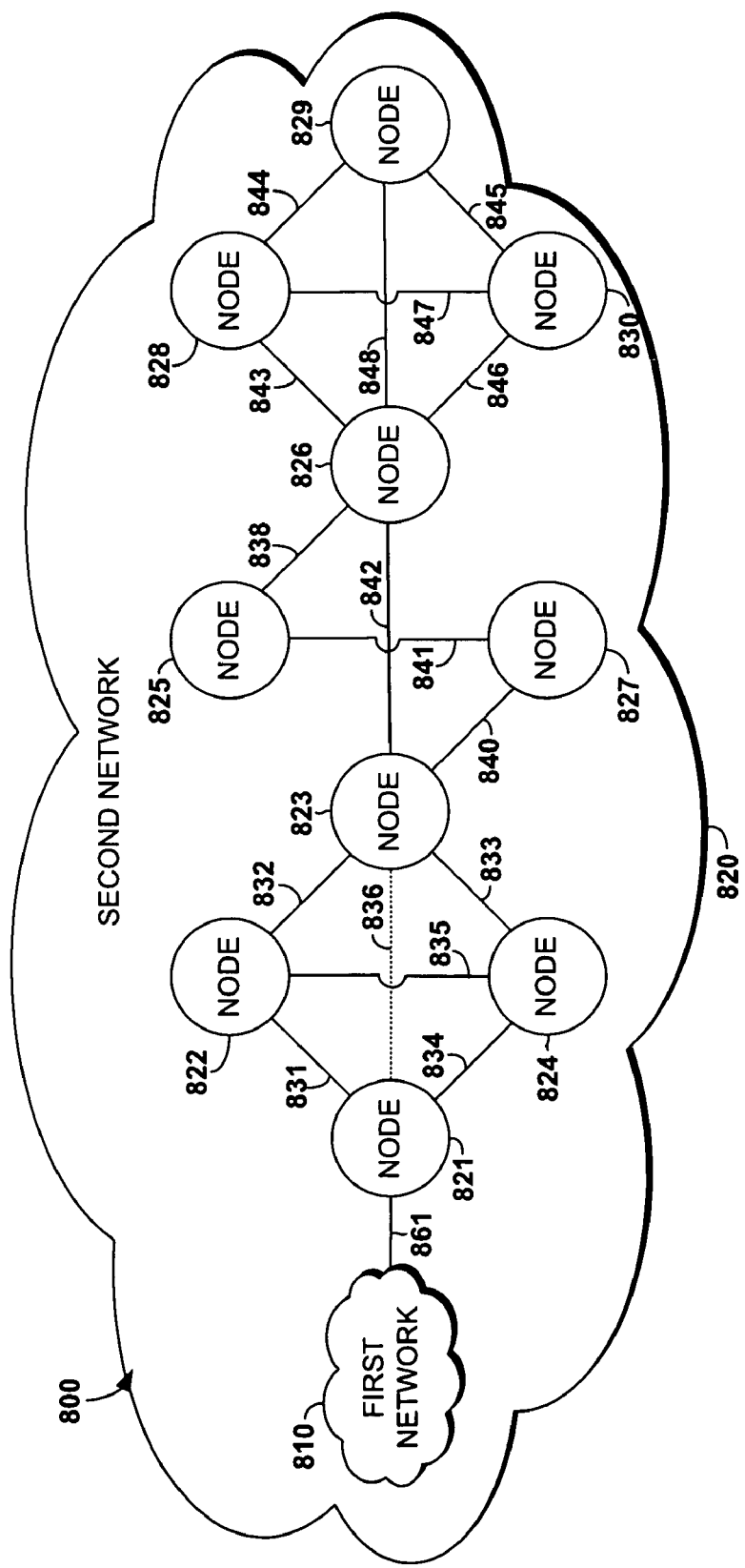
FIG. 9 is a schematic illustration of the apparent network available to a user of telecommunication network by accessing layer one resources dedicated to a carrier virtual network.

Referring now to FIG. 9, the apparent network available to a user of the first telecommunication network 810 incorporating the layer one resources dedicated to the carrier virtual network from the second network 820 is illustrated. To a customer accessing the first network 810, the network capabilities available now extend to the extent of the apparent network 910, which includes the first network 810 and the portion of layer resources allocated to the carrier virtual network from the second network 820 to the level of access each resource is dedicated to the carrier virtual network.

Figure 10:
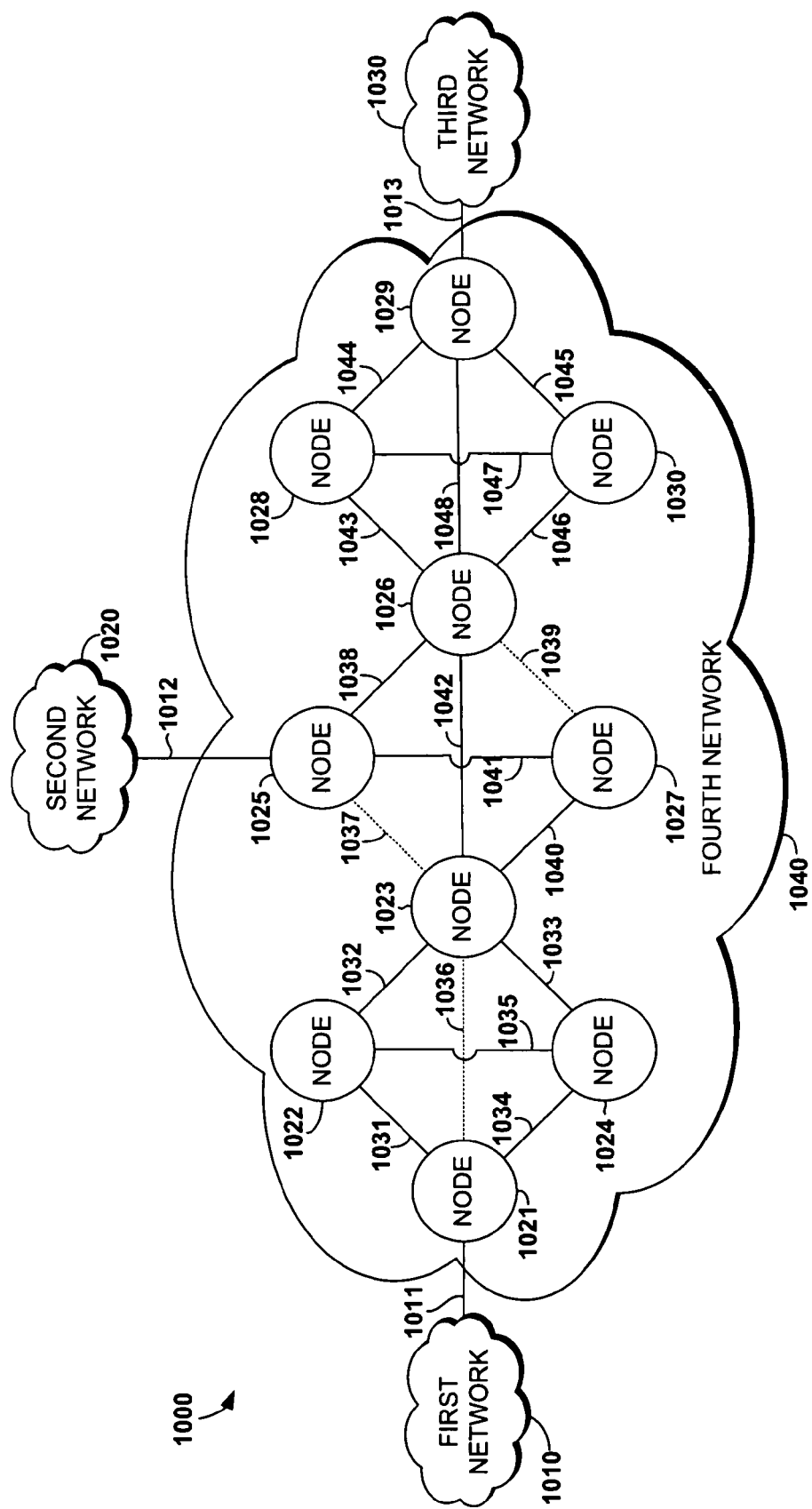
FIG. 10 is a schematic illustration of four telecommunication networks participating in three carrier virtual networks.

Referring now to FIG. 10, four telecommunication networks participating in three carrier virtual networks are illustrated. A first network 1010, a second network 1020, and a third network 1030 each has access to portions of the layer one resources of a fourth telecommunication network 1040 in carrier virtual network arrangement. It should be understood that the first network 1010, the second network 1020, and the third network 1030 may dedicate portions of their layer one resources to one or more carrier virtual networks as well, although that is not illustrated in FIG. 10.

Within the fourth network 1040 a first portion of layer one resources may be dedicated to a first carrier virtual network accessible by the first telecommunication network 1010. The first portion may comprise ports on node 1021, node 1023, node 1025, node 1027 as well as connection 1036, connection 1037, and connection 1040. The first telecommunication network 1010 may access the first portion of layer one resources dedicated to the first carrier virtual network using network connection 1011.

Within the fourth network 1040 a second portion of layer one resources may be dedicated to a second carrier virtual network accessible by the second telecommunication network 1020. The second portion may comprise ports on node 1023, node 1024, node 1025, node 1026, node 1027, node 1029 as well as connection 1033, connection 1038, connection 1040, connection 1041, and connection 1048. The second telecommunication network 1020 may access the second portion of layer one resources dedicated to the second carrier virtual network using network connection 1012.

Within the fourth network 1040 a third portion of layer one resources may be dedicated to a third carrier virtual network accessible by the third telecommunication network 1030. The third portion may comprise ports on node 1021, node 1022, node 1023, node 1024, node 1026, node 1027, node 1028, node 1029, node 1030 as well as connection 1031, connection 1032, connection 1035, connection 1039, connection 1040, connection 1044, connection 1045, and connection 1046. The third telecommunication network 1030 may access the third portion of layer one resources dedicated to the third carrier virtual network using network connection 1013.

Figure 11:
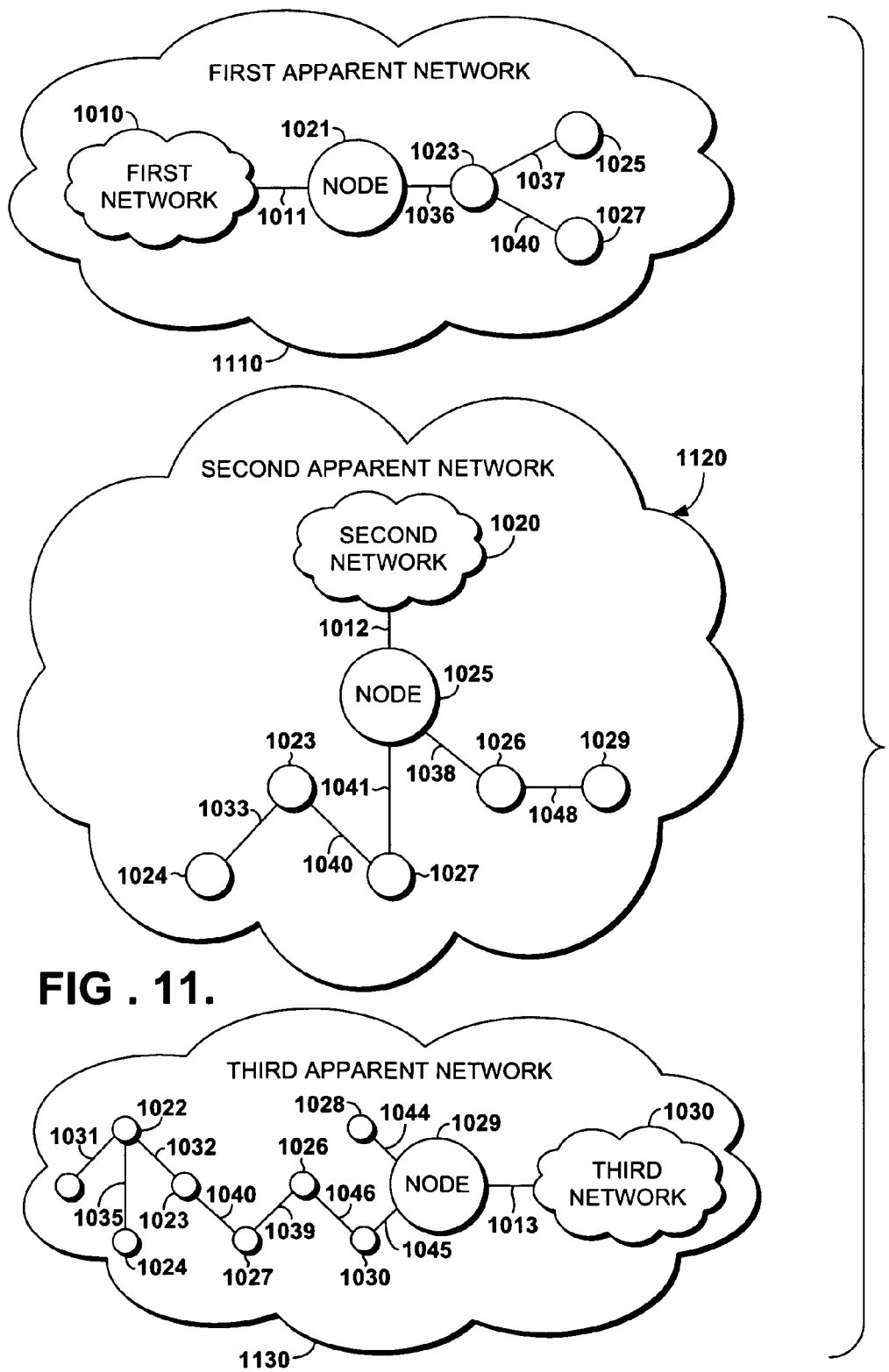
FIG. 11 is a schematic illustration of the apparent networks available to users of telecommunication networks by accessing layer one resources dedicated to carrier virtual networks.

Referring now to FIG. 11, the resulting apparent networks from the dedication of resources from the fourth network 1040 to the carrier virtual networks as illustrated in FIG. 10 are shown in greater detail. The first apparent network 1110 extends to both the first network 1010 and the first portion of layer one resources from the fourth network 1040 dedicated to the first carrier virtual network. The second apparent network 1120 extends to both the second network 1020 and the second portion of layer one resources of the fourth network 1040 dedicated to the second carrier virtual network. The third apparent network 1130 extends to both the third network 1030 and the third portion of layer one resources of the fourth network 1040 dedicated to the third carrier virtual network.

Figure 12:
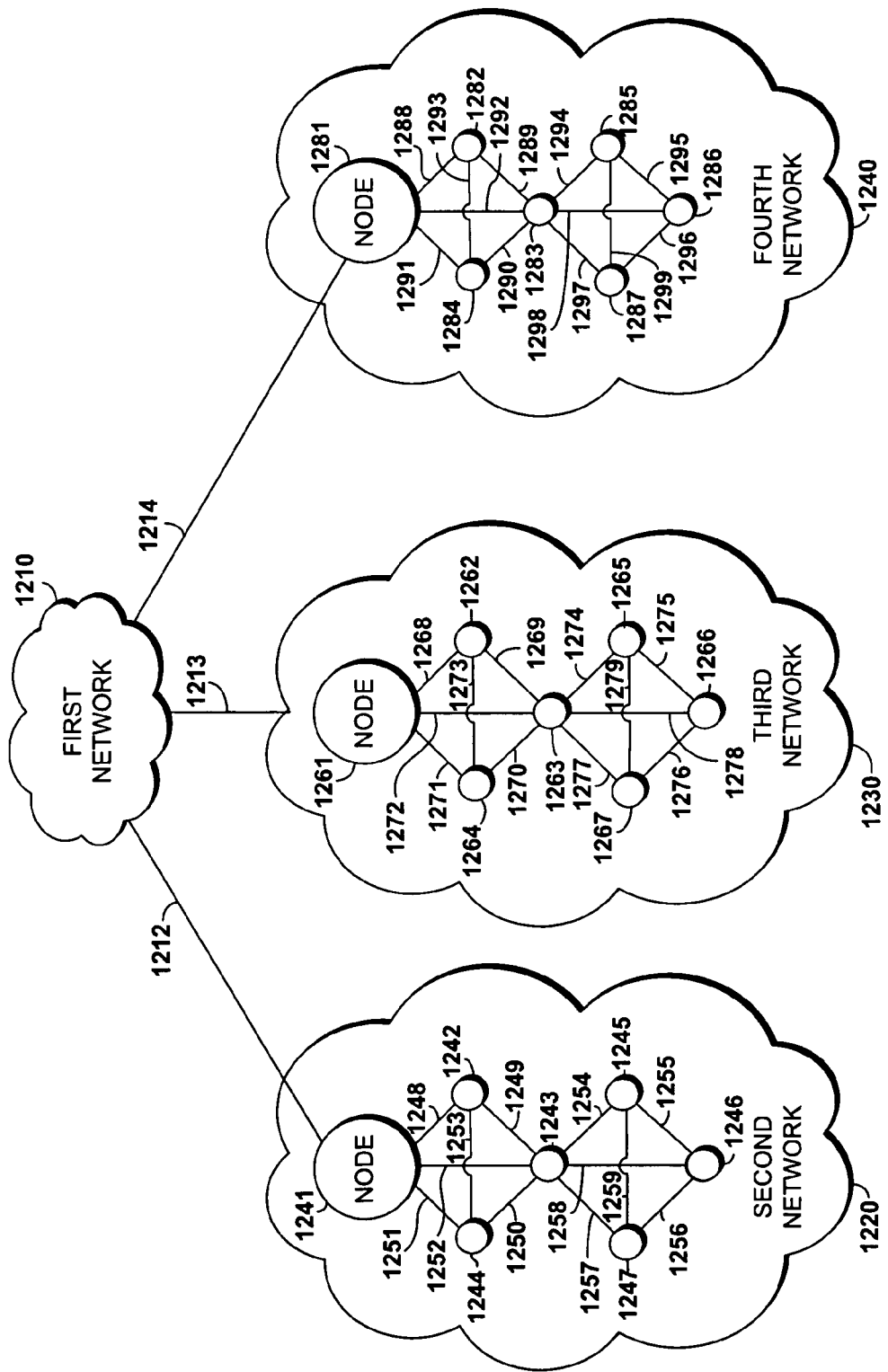
FIG. 12 is a schematic illustration of four telecommunication networks participating in a multiparty carrier virtual network.

Referring now to FIG. 12, four telecommunication networks participating in one carrier virtual network accessible to a single telecommunication network is illustrated. A first telecommunication network 1210 is connected to a second telecommunication network 1220 by network connection 1212, a third telecommunication network 1230 by network connection 1213, and a fourth telecommunication network 1240 by network connection 1214. The second network 1220, the third network 1230, and the fourth network 1240 each dedicates a portion of layer one resources to the carrier virtual network accessible by the first network. The second telecommunication network 1220 may dedicate a first portion of layer one resources comprising, for example, ports on node 1241, node 1242, node 1243, node 1244, node 1246, node 1247 as well as connection 1248, connection 1249, connection 1253, connection 1256, and connection 1257 to the carrier virtual network. The first telecommunication network may access the first portion of layer one resources dedicated to the carrier virtual network from the second telecommunication network using network connection 1212. The third telecommunication network may dedicate a second portion of layer one resources comprising, for example, ports on node 1261, node 1262, node 1263, node 1264, node 1265, node 1266, node 1267 as well as connection 1268, connection 1269, connection 1271, connection 1273, connection 1274, connection 1276, and connection 1279 to the carrier virtual network. The first telecommunication network may access the second portion of layer one resources dedicated to the carrier virtual network from the third telecommunication network using network connection 1213. The fourth telecommunication network 1240 may dedicate a third portion of layer one resources comprising, for example, ports on node 1281, node 1283, node 1284, node 1285, node 1286, node 1287 as well as connection 1290, connection 1291, connection 1294, connection 1295, connection 1296, and connection 1299 to the carrier virtual network. The first telecommunication network may access the third portion of layer one resources dedicated to the carrier virtual network from the fourth telecommunication network 1240 using network connection 1214. The portions of layer one resources dedicated to the carrier virtual network by the second telecommunication network 1220, the third telecommunication network 1230 and the fourth telecommunication network 1240 are available to the first telecommunication network 1210 as if they were part of the first telecommunication network 1210.

Figure 13:
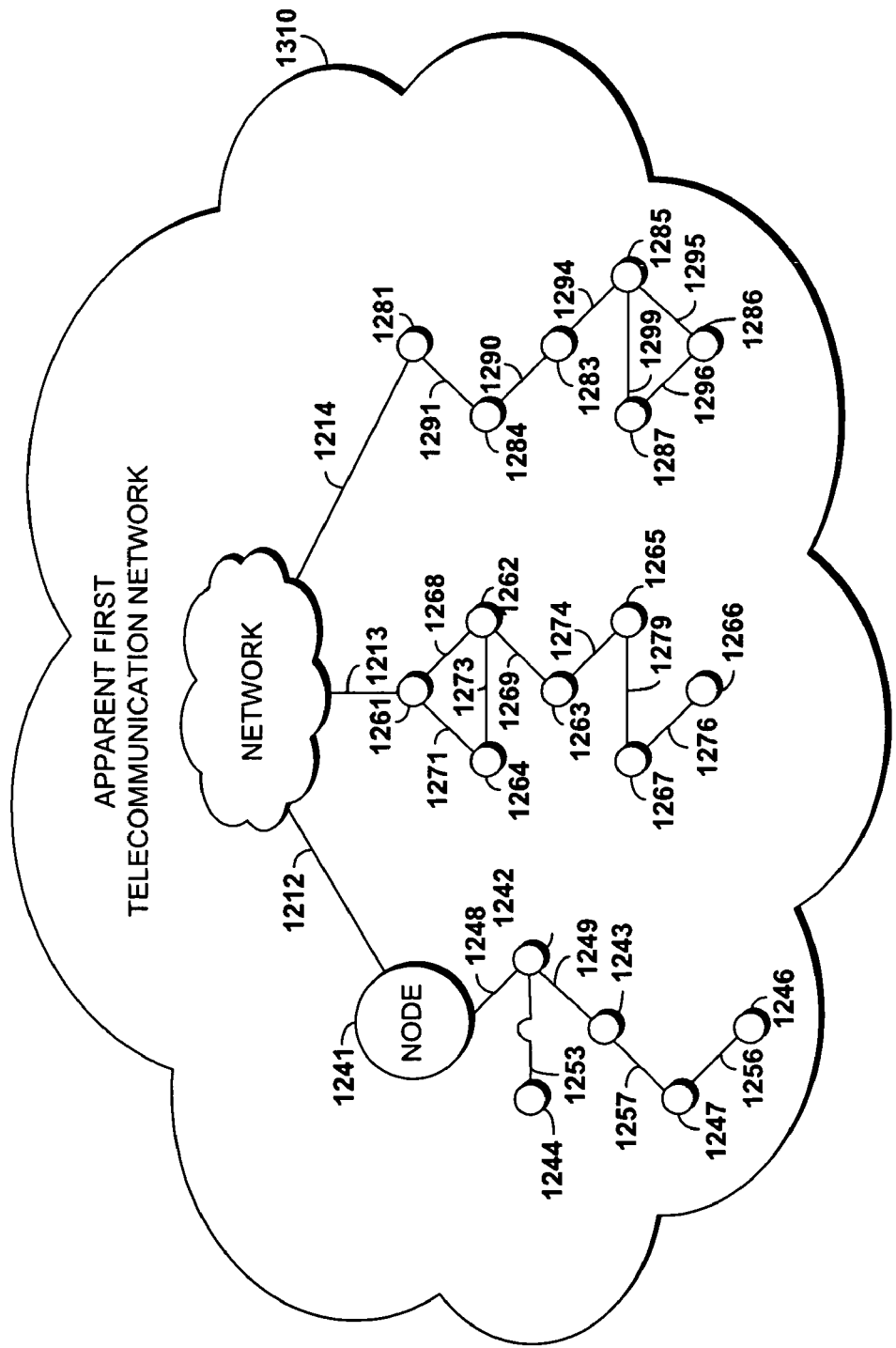
FIG. 13 is a schematic illustration of the apparent network available to a user of a telecommunication network by accessing layer one resources dedicated to a carrier virtual network.

FIG. 13 illustrates the apparent first telecommunication network 1310 available to a user of the first telecommunication network 1210 as a result of the dedication of layer one resources to the carrier virtual network. The resources available to the apparent first telecommunication network 1310 extends to the first telecommunication network 1210, the first portion of layer one resources dedicated to the carrier virtual network from the second telecommunication network 1210, the second portion of layer one resources dedicated to the carrier virtual network from the third telecommunication network 1230, and the third portion of layer one resources dedicated to the carrier virtual network from the fourth telecommunication network 1240.

It should be appreciated that in FIGS. 8-13 the means for exchanging information regarding the layer one resources dedicated to a carrier virtual network are not shown. The means for exchanging information may utilize a carrier virtual network system manager, possibly in combination with one or more carrier virtual network interfaces. If used, the carrier virtual network system manager may exchange information with the network system managers of participating telecommunication networks. If used, the carrier virtual network system manager may perform the function of a network system manager for some or all of the participating telecommunication networks. If no carrier virtual network system manager is used, the network system managers of participating telecommunication networks may directly exchange information using dedicated connections, network connections, or other means.

Figure 14:
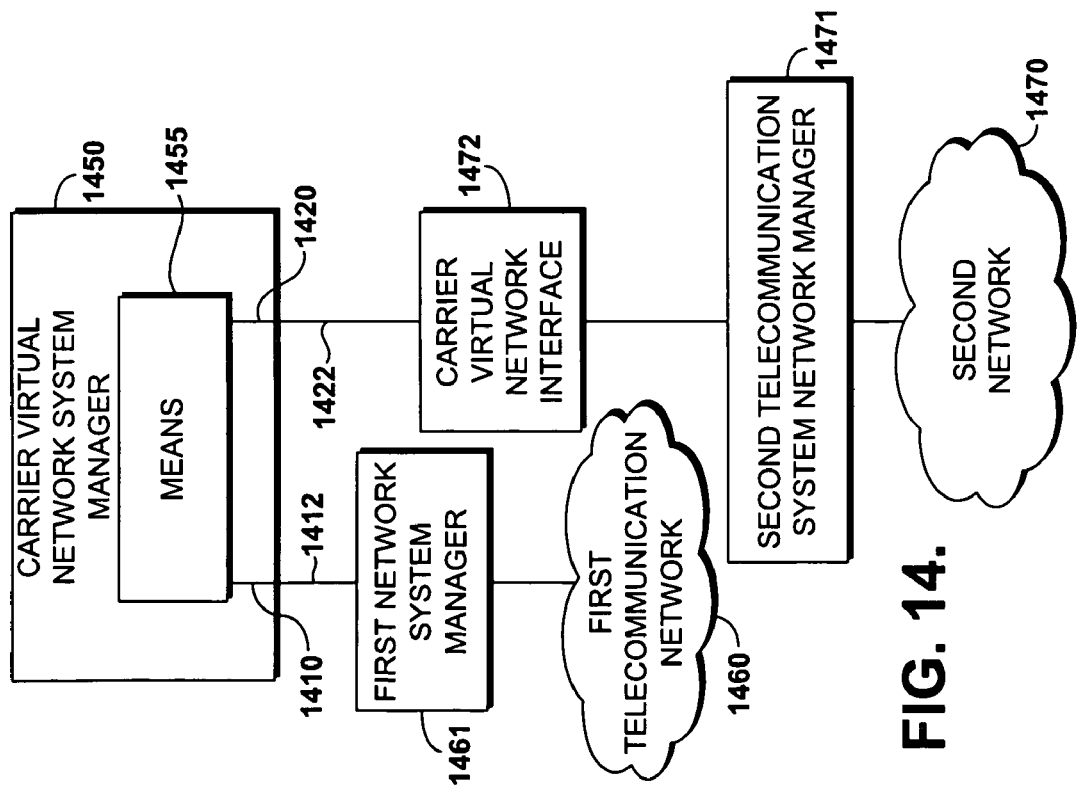
FIG. 14 is a schematic illustration of one embodiment of a carrier virtual network system manager and two participating telecommunication networks.

Referring now to FIG. 14, one possible embodiment of a carrier virtual network system manager 1450 is illustrated. The carrier virtual network system manager 1450 includes a means 1455 for maintaining information regarding layer one resources dedicated to a carrier virtual network. Means 1455 may comprise a suitable data base, electronic records, or other suitable means for maintaining and, optionally, updating information regarding the identity of portions of layer one resources dedicated to a carrier virtual network. Means 1455 may also retain information regarding participating telecommunication networks, particularly as to which participating telecommunication networks may access which carrier virtual networks maintained by the carrier virtual network system manager 1450. Means 1455 may be any type of computer readable or machine readable media with instructions to perform the method illustrated and described herein. One suitable use of machine readable media is the use of Java programming language in conjunction with a Unix or Linux server to create appropriate computer software.

The carrier virtual network system manager 1450 may further contain a first interface means 1410 for interfacing with a first telecommunication network 1460. As illustrated in FIG. 14, first interface means 1410 connects to a dedicated connection 1412, which connects the first telecommunication network 1460 and its first network system manager 1461 to the first interface means 1410 of the carrier virtual network system manager 1450. First interface means 1410 allows means 1455 to exchange information with the system manager 1461.

The carrier virtual network system manager 1450 may further contain a second interface means 1420. As illustrated in FIG. 14, the second interface means 1420 connects to a dedicated connection 1422 that connects the carrier virtual network system manager 1450 to a second network 1470. Dedicated connection 1422 connects the second interface means 1420 to a carrier virtual network interface 1472, which then connects to the second telecommunication system network manager 1471. Second interface means 1420 allows means 1455 to exchange information with the carrier virtual network interface 1472 and the system manager 1471. It should be noted that the carrier virtual network interface 1472, which is described in more detail above, may be omitted.

In further reference to FIG. 14, it should be appreciated that further interface means may be included in the carrier virtual network system manager 1450 to establish connections with additional participating telecommunication networks. For the sake of simplicity of illustration, only two participating telecommunication networks, a first telecommunication network 1460 and a second telecommunication network 1470, are illustrated in FIG. 14.

Figure 15:
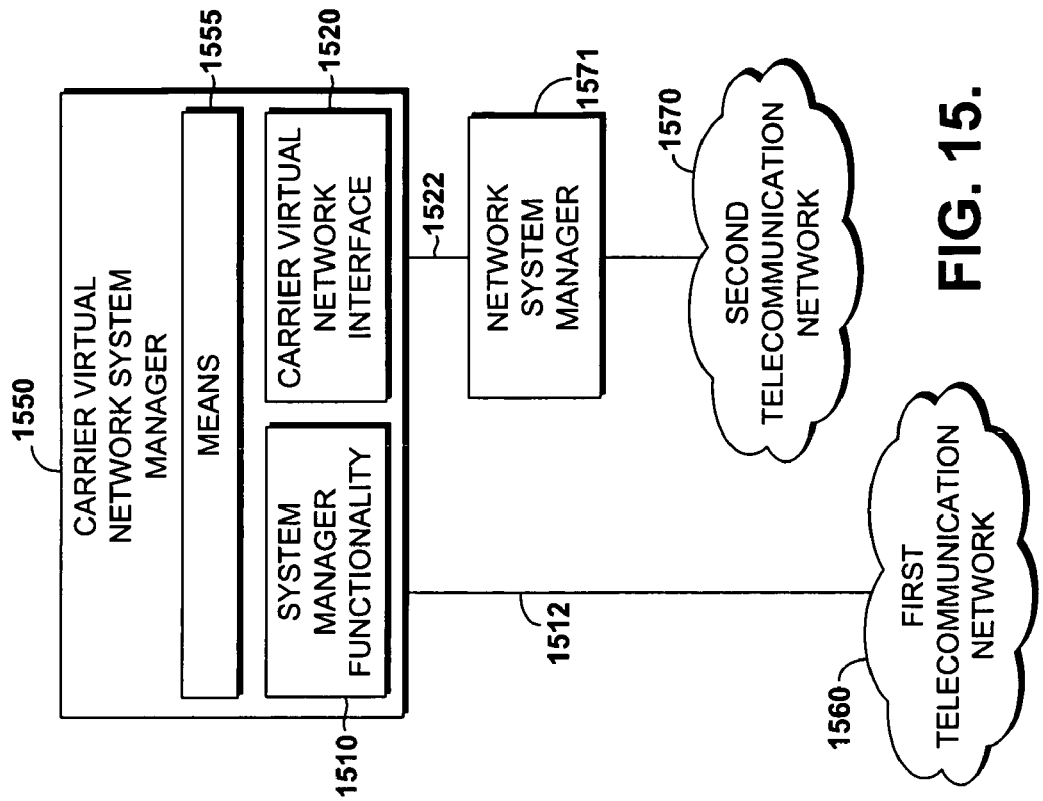
FIG. 15 is a schematic illustration of one embodiment of a carrier virtual network system manager and two participating telecommunication networks.

Referring now to FIG. 15, one alternative embodiment of a carrier virtual network system manager 1550 is illustrated. A carrier virtual network system manager 1550 may contain a means 1555 for maintaining information regarding the layer one resource dedicated to a carrier virtual network, and operates as described above with regard to means 1455. As illustrated in FIG. 15, the carrier virtual network system manager 1550 further comprises within it system manager functionality 1510 that manages the dedicated resources of first telecommunication network 1560 through connection 1512. The carrier virtual network system manager 1550 further includes within it a carrier virtual network interface 1520 that connects to the network system manager 1571 of a second telecommunication network 1570 via dedicated connection 1522. As with FIG. 14, it should be appreciated that additional connections to participating telecommunication networks may be made beyond those illustrated in FIG. 15.

In considering both FIG. 14 and FIG. 15, it should be appreciated that numerous variations can be made to a carrier virtual network system manager in accordance with the present invention beyond that illustrated. Functional capabilities such as system management and carrier virtual network interface functions may be optionally contained within the carrier virtual network system manager, or the carrier virtual network system manager may connect to external functional elements, or a combination thereof.

Figure 16:
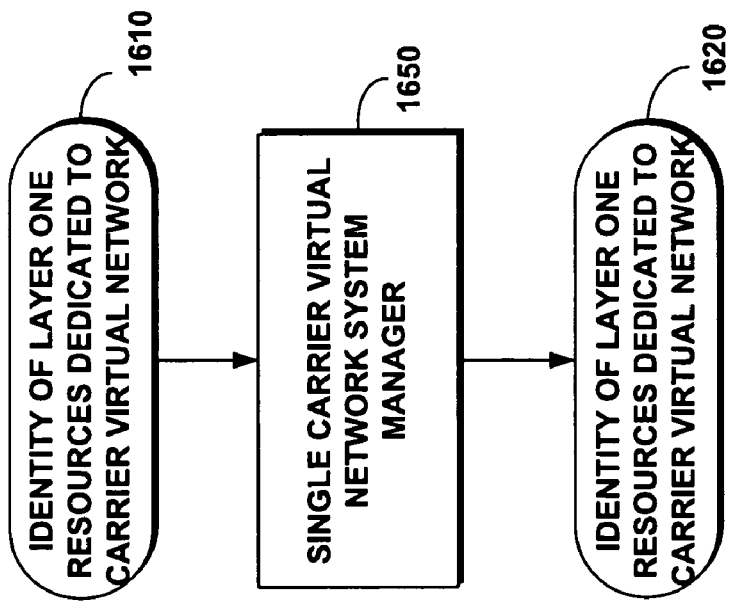
FIG. 16 is a schematic illustration of data flow in and out of carrier virtual network system manager.

Referring now to FIG. 16, the flow of data into and out of a carrier virtual network system manager 1650 is illustrated. Information 1610 enters into the carrier virtual network system manager 1650 regarding the identity of layer one resource dedicated to carrier virtual network. Information 1610 will originate from participating telecommunication networks that are dedicating layer one resources to a carrier virtual network. Information 1610 may originate, more specifically, from the network system managers of participating networks that are dedicating layer one resources to a carrier virtual network. If the carrier virtual network system manager 1650 is performing network system management functions for a telecommunication network, the information 1610 may be generated internal to the carrier virtual network system manager 1650. Not all telecommunication networks participating in a carrier virtual network may provide information 1610, as a telecommunication network that is accessing a carrier virtual network only, not dedicating layer one telecommunication resources to a carrier virtual network, will not provide information 1610.

Information 1620 is outputted from the carrier virtual network system manager 1650. Information 1620 serves to identify the layer one telecommunication resources dedicated to a given carrier virtual network. Information 1620 may be outputted to the telecommunication networks that may access a given carrier virtual network. While information 1620 could be outputted to all participating telecommunication networks, information 1620 may be appropriately transmitted only to participating telecommunication networks that may access a given carrier virtual network. In this fashion, each participating telecommunication network that may access a carrier virtual network will receive information 1620 only regarding those layer one telecommunication resources that are dedicated to a carrier virtual network that that particular participating telecommunication network may access. Information regarding layer one telecommunication resource dedicated to a carrier virtual network that may not be accessed by a particular participating telecommunication network need not be included in information 1620 outputted to that telecommunication network. If the network system manager function for a particular participating telecommunication network is being performed by the carrier virtual network system manager 1650 the process of outputting information 1620 would involve providing the information 1620 to that functional aspect of the carrier virtual network system manager 1650.

In further reference to FIG. 16, it should be appreciated that a single carrier virtual network system manager 1650 may be used to establish and maintain any number of carrier virtual networks involving any number of participating telecommunication networks. In such a scenario, not all telecommunication networks participating in a carrier virtual network need participate in all carrier virtual networks. The carrier virtual network system manager 1650 may maintain an appropriate record of which telecommunication networks are participating in which carrier virtual network, which may comprise whether a given telecommunication network has dedicated resources to a given carrier virtual network and whether a given telecommunication network may access a given carrier virtual network. If a participating telecommunication network dedicates layer one resource to a carrier virtual network it will input information 1610 to the carrier virtual network system manager 1650. If a participating telecommunication network may access a carrier virtual network, it will receive information 1620 from the carrier virtual network system manager 1650. If a participating telecommunication network both dedicates layer one resources to a carrier virtual network and may access a carrier virtual network, that participating telecommunication network will both input information 1610 and receive information 1620 with the carrier virtual network system manager 1650.

The information 1610, 1620, exchanged using the carrier virtual network system manager 1650 should be sufficient to identify the layer one resources dedicated to a carrier virtual network and may, optionally, include information regarding which carrier virtual network each layer one resource is dedicated to and the level of access for each resource. Communication protocols and standards to identify layer one resources have been developed and are employed by various telecommunication network system managers. A currently accepted standard may be used, or a specialized standard may be developed and implemented for the carrier virtual network system manager 1650. It should be recalled that carrier virtual network interfaces may be used to convert between standards used by various telecommunication network system managers and the standard employed by the carrier virtual network system manager 1650. It should be further recalled that the carrier virtual network interface may be included within the carrier virtual network system manager 1650 or may be external to it. The use of a carrier virtual network system manager 1650 and appropriate carrier virtual network interfaces facilitates the establishment of a carrier virtual network by overcoming difficulties in identifying layer one resources dedicated to a carrier virtual network that may arise due to differing protocols and standards used in various system managers.

Figure 17:
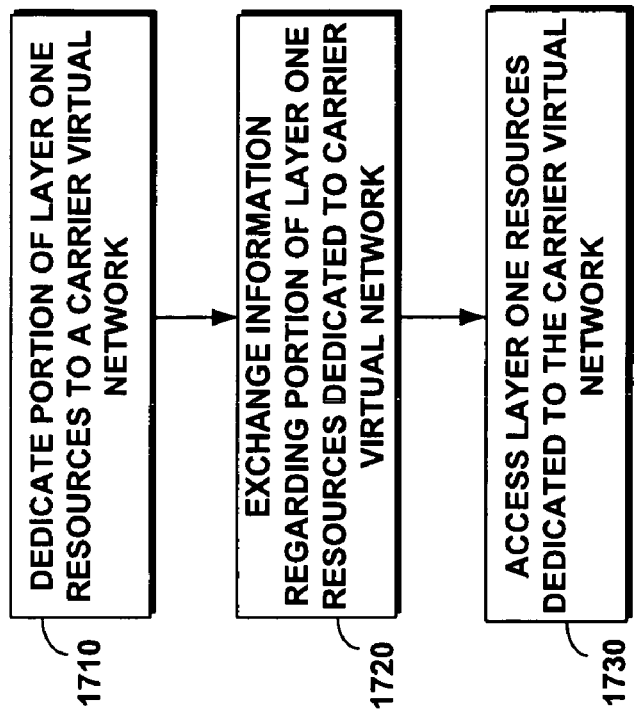
FIG. 17 is a flow diagram of one method for forming a carrier virtual network.

Referring now to FIG. 17, a method 1700 for establishing a carrier virtual network is illustrated. In step 1710 a portion of layer one resources are dedicated to a carrier virtual network. Step 1710 may be repeated any number of times to dedicate multiple portions of layer one resources to a single carrier virtual network, to dedicate multiple portions of layer one resources to multiple carrier virtual networks, or both. In step 1720 information is exchanged regarding a portion of layer one resources dedicated to carrier virtual networks. The exchange of information in step 1720 may utilize a carrier virtual network system manger, or may occur directly between the network system managers of participating telecommunication networks. In step 1730 the portion layer one resources dedicated to a carrier virtual network are accessed. The step 1730 of accessing layer one resources dedicated to a carrier virtual network may utilize a network connection between participating telecommunication networks.

Figure 18:
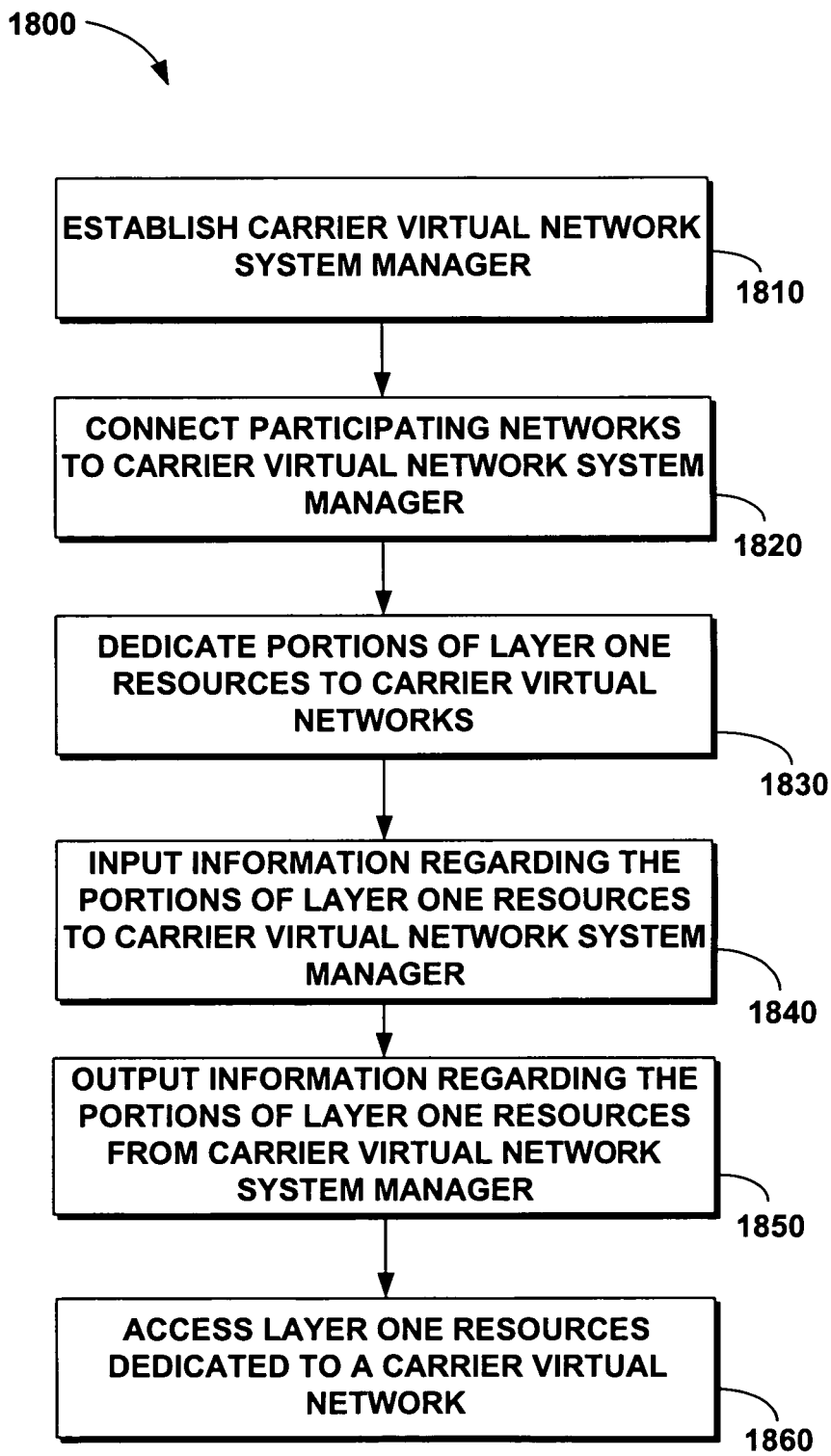
FIG. 18 is a flow diagram of one method for forming a carrier virtual network.

Referring now to FIG. 18, an example of another method 1800 of establishing a carrier virtual network is illustrated. In step 1810 a carrier virtual network system manager, some embodiments of which are described more fully above, is established. In step 1820 the participating telecommunication networks are connected to the carrier virtual network system manager. The way in which participating telecommunication networks are connected to the carrier virtual network system manager may vary. Acceptable connections may be, for example, web based connections, dedicated connections, wireless connections, and some combination of these. In step 1830, portions of the layer one resources of participating telecommunication networks are dedicated to carrier virtual networks. In step 1840, information regarding the portions of layer one resources dedicated to carrier virtual networks is input into the carrier virtual network system manager. In step 1850, information regarding the layer one resources dedicated to carrier virtual network is output from the carrier virtual network system manager. It should be recalled that while step 1850 may involve the carrier virtual network system manager providing information to all participating telecommunication networks, it may also appropriately involve the carrier virtual network system manager providing information identifying the portions of layer one resources dedicated to a carrier virtual network only to those participating telecommunication networks that may access the carrier virtual networks. In step 1860 the portions of layer one resources dedicated to a carrier virtual network are accessed by telecommunication networks that may access the given carrier virtual network. It should be recalled that a network connection may be used to perform step 1860.

Figure 19:
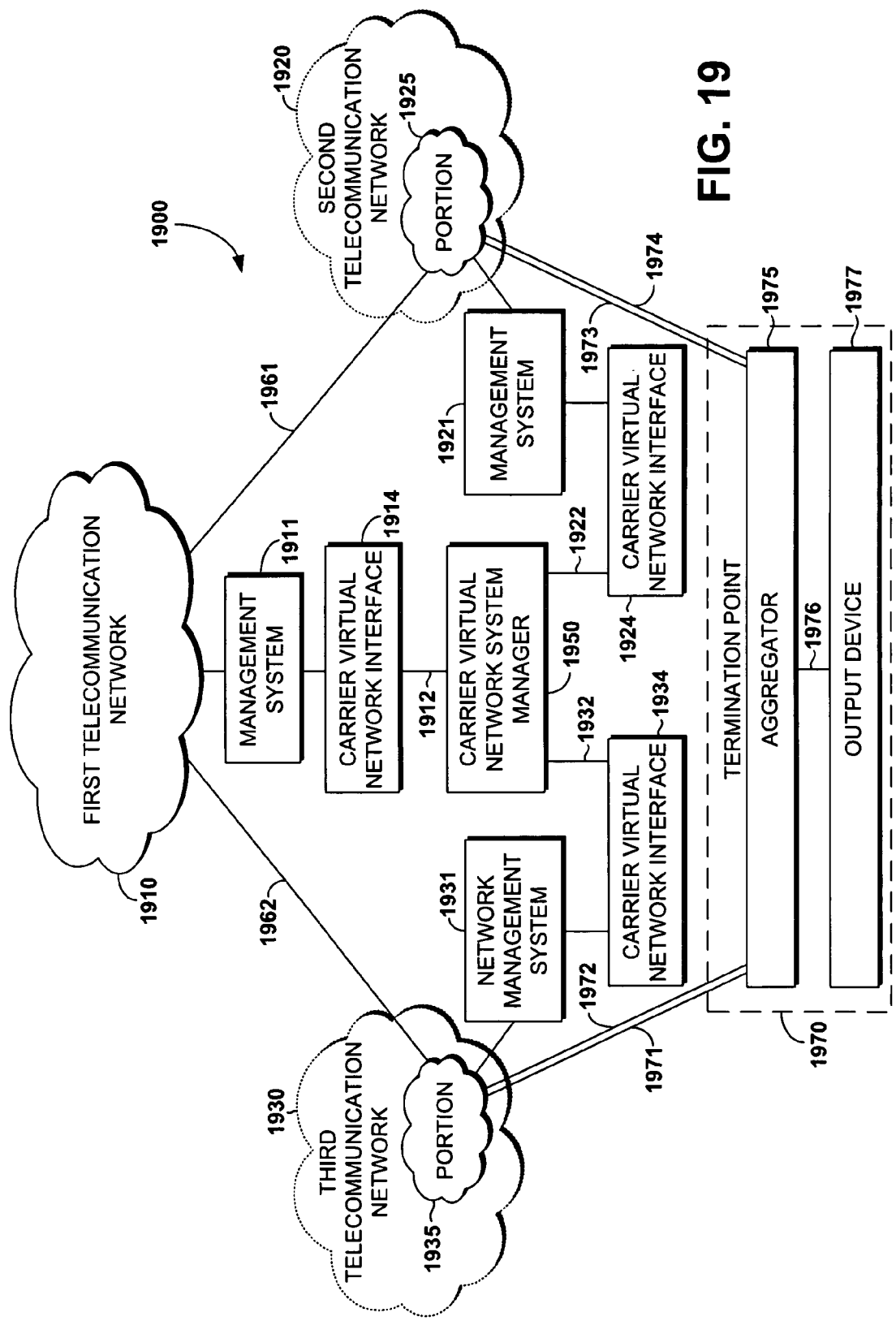
FIG. 19 is a schematic illustration of one embodiment of an inverse multiplexed connection using layer one resources dedicated to a carrier virtual network.

Referring now to FIG. 19, an inversed multiplexed connection using layer one resources dedicated to a carrier virtual network is illustrated. A first telecommunication network 1910, which may also be thought of as an accessing telecommunication network, is managed by a management system 1911. The management system 1911 of the first telecommunication network 1910 connects to the carrier virtual network manager 1950 through a carrier virtual network interface 1914 and a dedicated connection 1912. It should be recalled that a carrier virtual network interface 1914 may be omitted, in which case dedicated connection 1912 will directly connect the carrier virtual network manager 1950 and the management system 1911 of the first telecommunication network 1910.

A network connection 1961 connects the accessing telecommunication network 1910 to a portion of layer one resources 1925 dedicated to the carrier virtual network. A portion of layer one resources 1925 is dedicated to the carrier virtual network from a second telecommunication network 1920. The second telecommunication network 1920 may also be referred to as a dedicating telecommunication network. It should be appreciated that the second telecommunication network 1920 may be thought of as a dedicating network in system 1900, as it dedicates a portion 1925 of layer one resources to the carrier virtual network. Likewise, other dedicating telecommunication networks described herein may also be accessing telecommunication networks, and accessing telecommunication networks may also be dedicating telecommunication networks. However, the second telecommunication network 1920 may also function as an accessing network in other carrier virtual network arrangements, which are not illustrated in FIG. 19. A management system 1921 directly manages the second telecommunication network 1920, including the portion 1925 of layer one resources dedicated to the carrier virtual network. It should be recalled, however, that the management system 1911 of the accessing telecommunication network may indirectly manage the portion 1925 of layer one resources dedicated to the carrier virtual network from the dedicating telecommunication network 1920 as described herein. Management system 1921 connects to the carrier virtual network management system 1950 through a carrier virtual network interface 1924 and a dedicated connection 1922. It should be recalled that the carrier virtual network interface 1924 may be omitted, in which case dedicated connection 1922 would directly connect carrier virtual network system manager 1950 and the management system 1921 of the second telecommunication network 1920.

A network connection 1962 connects to a further portion of layer one resources 1935 dedicated to the carrier virtual network. Further portion 1935 of layer one resources are dedicated to the carrier virtual network from a third telecommunication network 1930. The third telecommunication network 1930 may also be thought of as a dedicating telecommunication network, as it dedicates a portion 1935 of layer one resources to the carrier virtual network. It should be further recalled that the third telecommunication network 1930 may also function as an accessing telecommunication network in a separate carrier virtual network arrangement, not illustrated. The third telecommunication network 1930, including the portion 1935 of layer one resources dedicated to the carrier virtual network, are directly managed by the work management system 1931 of the third telecommunication 1930. It should be realized that the network management system 1911 of the accessing telecommunication network 1910 indirectly manages the portion 1935 of layer one resources dedicated to the carrier virtual network from the dedicating telecommunication network 1930 as described herein. Network system manager 1931 connects to the carrier virtual network system manager 1950 through a carrier virtual network interface 1934 at a dedicated connection 1932. It should be recalled that the carrier virtual network interface 1934 may be omitted, in which case dedicated connection 1932 will directly connect the carrier virtual network manager 1950 and the network management system 1931 of the third telecommunication network 1930.

The system 1900 illustrated in FIG. 19 is particularly useful for aggregating a plurality of links into a higher bandwidth connection to a termination point 1970, which may be, for example, a customer location. System 1900 aggregates links to establish a logically unitary high bandwidth connection without regard to whether the component links of the high bandwidth connection utilize layer one resources of the accessing telecommunication network 1910, a first dedicating telecommunication network 1920, or a second dedicating telecommunication network 1930. While only a first dedicating telecommunication network 1920 and a second dedicating telecommunication network 1930 are illustrated in FIG. 19, it should be appreciated that any number of dedicating telecommunication networks may be used in system 1900.

As illustrated in FIG. 19, a first link 1971 connects to termination point 1970 using layer one resources included in the portion 1935 of layer one resources dedicated to the carrier virtual network from the third telecommunication network 1930. A second link 1972 connects to the termination point 1970 using layer one resources from the portion 1935 of the layer one resources dedicated to the carrier virtual network from the third telecommunication network 1930. A third link 1973 may connect to the termination point 1970 using layer one resources from the portion 1925 of layer one resources dedicated to the carrier virtual network from the second telecommunication network 1920. A fourth link 1974 may connect to termination point 1970 using layer one resources from the portion 1925 of layer one resources dedicated to the carrier virtual network from the second telecommunication network 1920. It should be appreciated that the plurality of links aggregated in accordance with the present invention may be more or less than the four illustrated in FIG. 19. At the termination point 1970 an aggregator 1975 may aggregate the plurality of links into a single high bandwidth connection 1976. The high bandwidth connection 1976 may terminate in an output device 1977, which may be a modem or other suitable device. While aggregator 1975 aggregates the plurality of links at the termination point, the carrier virtual network system manager 1950 logically aggregates the links within the carrier virtual network.

Figure 20:
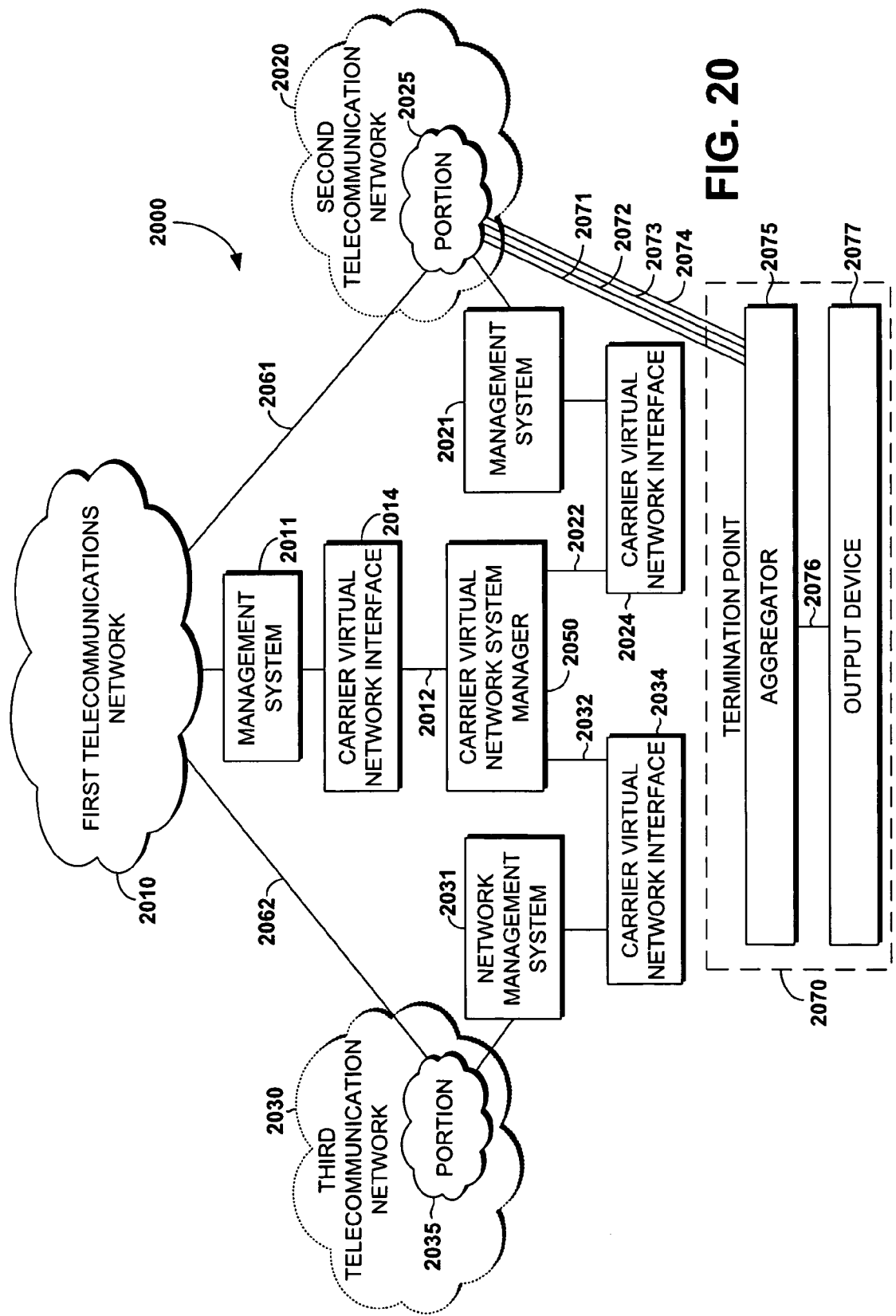
FIG. 20 is a schematic illustration of one embodiment of an inverse multiplexed connection using layer one resources dedicated to a carrier virtual network.

Referring now to FIG. 20, an alternative aggregated connection using the present invention is illustrated. As illustrated in FIG. 20, system 2000 will provide the same connectivity to the user by using different links to aggregate into a high bandwidth connection 2076. A first telecommunication network 2010, that may also be thought of as an accessing telecommunication network, is managed by a management system 2011. Management system 2011 connects to a carrier virtual network system manager 2050 through a carrier virtual network interface 2014 and a dedicated connection 2012. If carrier virtual network interface 2014 is omitted, dedicated connection 2012 directly connects management system 2011 to carrier virtual network system manager 2050.

A network connection 2061 connects the accessing telecommunication network 2010 to a portion 2025 of layer one resources dedicated to the carrier virtual network from a dedicating telecommunication network 2020. Dedicating telecommunication network 2020 may also be referred to as the second telecommunication network. The layer one resources of the second telecommunication network 2020, including the portion 2025 of layer one resources dedicated to the carrier virtual network, is directly managed by a management system 2021. It should be recalled that the management system 2011 of the first telecommunication network 2010 indirectly manages the portion 2025 of layer one resources dedicated to the carrier virtual network from the second telecommunication network 2020 in accordance with the present invention. The management system 2021 connects to the carrier virtual network system manager 2050 through a carrier virtual network interface 2024 and a dedicated connection 2022. If carrier virtual network interface 2024 is omitted, dedicated connection 2022 may directly connect management system 2021 to carrier virtual network system manager 2050.

Network connection 2062 connects accessing telecommunication network 2010 to further portion 2035 of layer one resources dedicated to the carrier virtual network from another dedicating network 2030. This dedicating network 2030 may also be referred to as the third telecommunication network. A network management system 2031 directly manages the layer one resources of the third telecommunication network 2030, including the portion 2035 of layer one resources dedicated to the carrier virtual network. It should be recalled that management system 2011 indirectly manages the portion 2035 of layer one resources dedicated to the carrier virtual network from the third telecommunication network 2030 in accordance with the present invention. Management system 2031 connects to the carrier virtual network system manager 2050 through a carrier virtual network interface 2034 and a dedicated connection 2032. If carrier virtual network interface 2034 is omitted, dedicated connection 2032 may directly connect management system 2031 to the carrier virtual network system manager 2050.

As illustrated in FIG. 20, a plurality of links may be aggregated to form a single high bandwidth connection 2076. The first link 2071, the second link 2072, the third link 2073 and the fourth link 2074 all connect to termination point 2070 using layer one resources from the portion 2025 of layer one resources dedicated to the carrier virtual network from the second telecommunication network 2020. Aggregator 2075 at termination point 2070 aggregates the plurality of links into a single high bandwidth connection 2076. High bandwidth connection 2076 may terminate with an appropriate output device 2077, such as a modem. Aggregator 2075 functions to aggregate the plurality of links into a single high bandwidth connection 2076 at the termination point 2070. Carrier virtual network system manager 2050 serves to logically aggregate the plurality of links in the carrier virtual network.

It should be appreciated that to a customer at termination point 2070 the connection aggregated from a plurality of links will appear identical regardless as to whether system 1900 illustrated in FIG. 19 or system 2000 illustrated in FIG. 20 are implemented. In fact, as further illustrated and described below, the plurality of links aggregated into a high bandwidth connection may vary in accordance with the present invention due to network demands or impairments without the customer experiencing a change in service.

Figure 21:
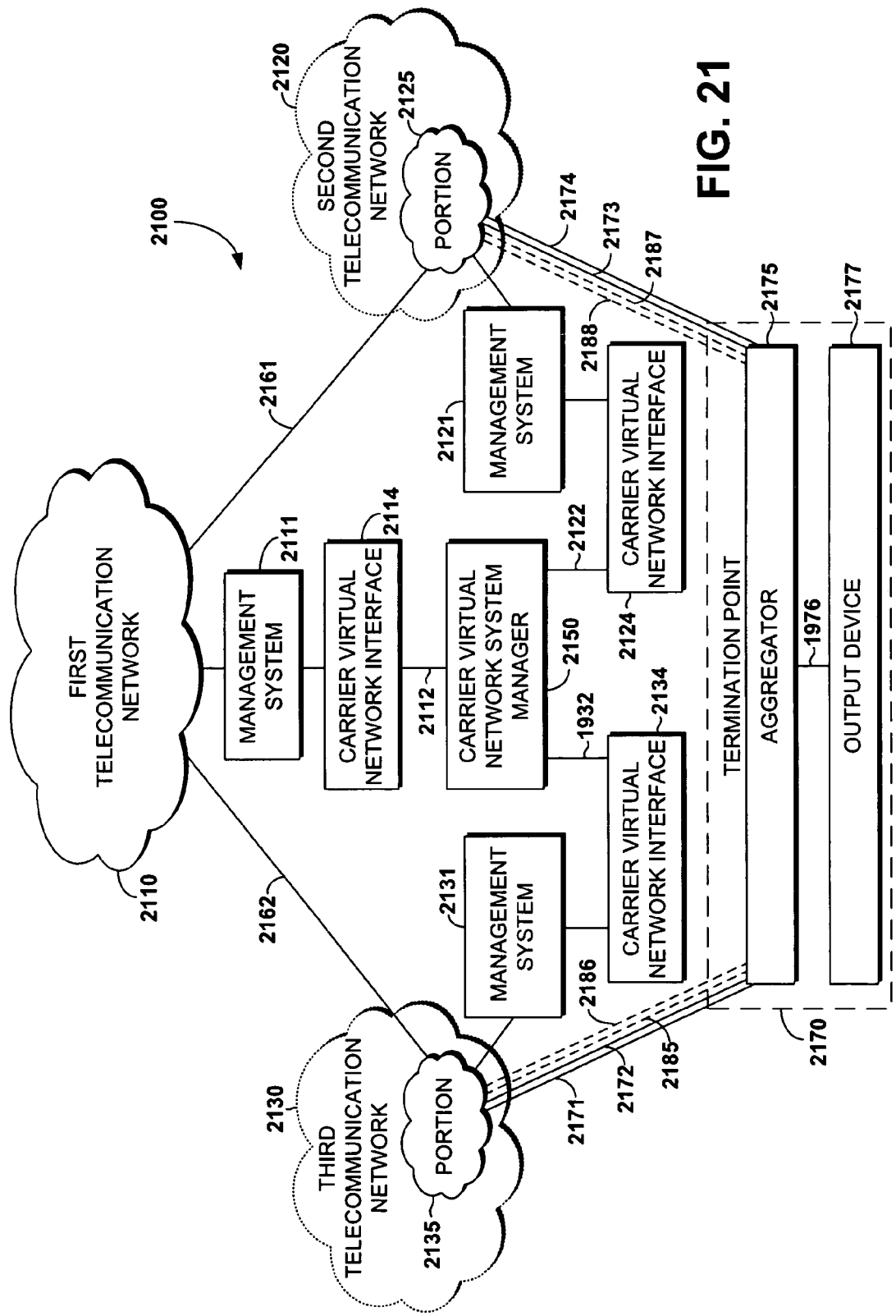
FIG. 21 is a schematic illustration of one embodiment of an inverse multiplexed connection using layer one resources dedicated to a carrier virtual network.

FIG. 21 illustrates a system 2100 in accordance with the present invention wherein the plurality of links aggregated into a high bandwidth connection 2176 may vary over time. As illustrated in FIG. 21, a first telecommunication network 2110, which may also be referred to as an accessing in telecommunication network, is managed by a management system 2111. Management system 2111 connects to a carrier virtual network system manager 2150 through a carrier virtual network interface 2114 and a dedicated connection 2112. If carrier virtual network interface 2114 is omitted, dedicated connection 2112 may directly connect management system 2111 to carrier virtual network system manager 2150. Network connection 2161 connects to layer one resources of the accessing telecommunication network 2110 to a portion 2125 of layer one resources dedicated to the carrier virtual network from a dedicating telecommunication network 2120. Dedicating telecommunication network 2120 may also be referred to as the second telecommunication network. The layer one resources of the second telecommunication network 2120, including portion 2125 of layer one resources dedicated to the carrier virtual network, are directly managed by management system 2121. It should be recalled that portion 2125 of layer one resources dedicated to the carrier virtual network are indirectly managed by management system 2111 in accordance with the present invention. Management system 2121 connects to the carrier virtual network system manager 2150 through carrier virtual network interface 2124 and dedicated connection 2122. If carrier virtual network interface 2124 is omitted, dedicated connection 2122 may directly connect carrier virtual network system manager 2150 to management system 2121.

Network connection 2162 may connect the layer one resources of the accessing telecommunication network 2110 to a portion 2135 of layer one resources dedicated to the carrier virtual network from a dedicating telecommunication network 2130. Dedicating telecommunication network 2130 may also be referred to as the third telecommunication network. The layer one resources of the third telecommunication network 2130, including the portion 2135 of layer one resources dedicated to the carrier virtual network, are directly managed by management system 2131. It should be recalled that the portion 2135 of layer one resources dedicated to the carrier virtual network are indirectly managed by management system 2111 in accordance with the present invention. Management system 2131 connects to carrier virtual network manager 2150 through carrier virtual network interface 2134 and dedicated connection 2132. If carrier virtual network interface 2134 is omitted, dedicated connection 2132 may directly connect carrier virtual network system manager 2150 and management system 2131.

In accordance with system 2100, a plurality of lengths and a plurality of alternative links may be used to provide a single high bandwidth connection 2176 at termination point 2170. Once again, termination 2170 may be a customer's premises. As illustrated in FIG. 21, a first link 2171 and a second link 2172 may connect to termination point 2170 using layer one resources from the portion 2135 of layer one resources dedicated to the carrier virtual network from the third telecommunication network 2130. The third link 2173 and the fourth link 2174 may connect to termination point 2170 using layer one resources dedicated to the carrier virtual network from portion 2125 of layer one resources dedicated to the carrier virtual network from the second telecommunication network 2120. An aggregator 2175 aggregates the plurality of links into a single high bandwidth connection 2176. High bandwidth connection 2176 may terminate an output device 2177, such as a modem. Carrier virtual network system manager 2150 logically aggregates the plurality of links in the carrier virtual network.

As further illustrated in FIG. 21, a plurality of alternative links may be identified for use in the event one or more of the plurality of links originally aggregated to form a single high bandwidth connection 2176 becomes impaired, for any reason unavailable, or for any reason unable to be satisfactorily used. As illustrated in FIG. 21, a first alternative link 2185 and a second alternative link 2186 may connect to termination point 2170 using the layer one resources of portion 2135 of layer one resources dedicated to the carrier virtual network from the third telecommunication 2130. Likewise, a third alternative link 2187 and a fourth alternative link 2188 may connect to termination point 2170 using layer one resources from portion 2125 of layer one resources dedicated to the carrier virtual network from the second telecommunication network 2120. If a link being aggregated into a single high bandwidth connection 2176 becomes impaired, such as, for example, the third link 2173, an alternative link may be included in the aggregate to maintain the bandwidth of the high bandwidth connection 2176. For example, the first alternative link 2185 may be placed into service and aggregated by aggregator 2175 at the termination point 2170 and logically aggregated by carrier virtual network system manager 2150 in the carrier virtual network. In this fashion, the standard of service experience by a customer at termination point 2170 is uninterrupted and undiminished. As illustrated in FIG. 21, depending upon which alternative of the plurality of links fall out of use and which of the alternative links are used, the plurality of links may utilize layer one resources from both portion 2135 of layer one resources dedicated to the carrier virtual network from the third telecommunication network 2130 and layer one resources from portion 2125 dedicated to the carrier virtual network from the second telecommunication network 2120. Likewise, the plurality of links aggregated into a single high bandwidth connection 2176 may all utilize the layer one resources from portion 2135 of layer one resources dedicated to the carrier virtual network from the third telecommunication network 2130, where the plurality of links aggregated into a single high bandwidth connection 2176 may all utilize the layer one resources of portion 2125 of layer one resources dedicated to the carrier virtual network from the second telecommunication 2120. It should, of course, be further realized that the number of dedicated telecommunication networks utilized in accordance with the present invention may greatly exceed the two dedicating telecommunication networks illustrated in FIG. 21. Regardless as to the telecommunication network dedicating the layer one resources utilized in a link in the aggregate or an alternative link in the aggregate, the customer at termination point 2170 experiences the same level of services.

Figure 22:
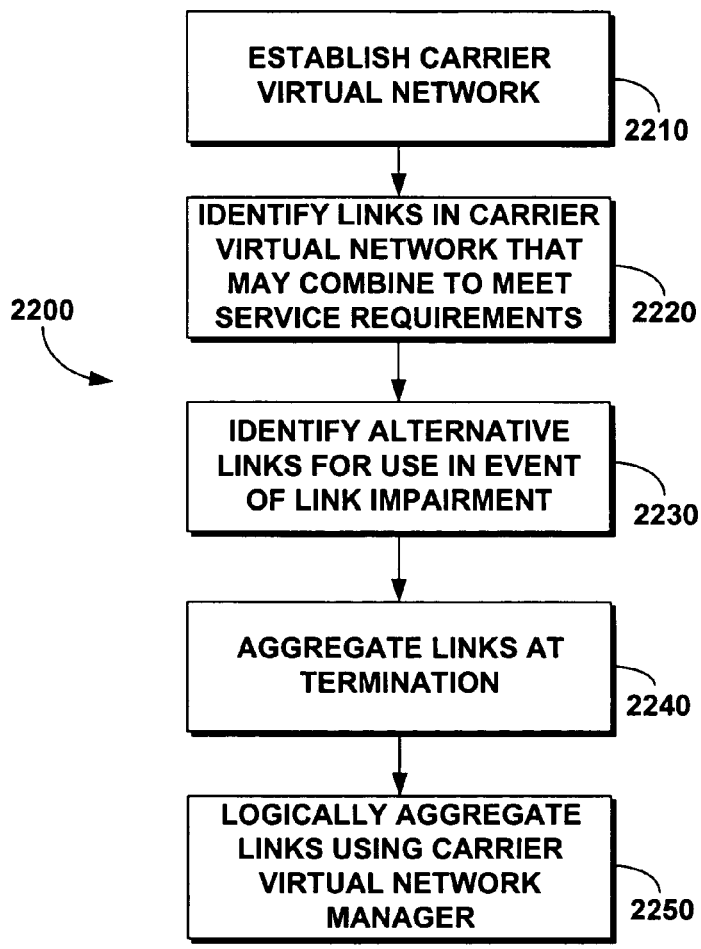
FIG. 22 is a flow diagram of one method for establishing an inverse multiplexed connection using layer one resources dedicated to a carrier virtual network.

Referring now to FIG. 22, a method 2200 for aggregating a plurality of links into a single high bandwidth connection is illustrated. In step 2210, a virtual network is established. In step 2220 links in the carrier virtual network are identified that may be combined to meet the service requirements. The service requirements met in step 2220 may be, for example, the service requirements imposed in a service level agreement with a customer for matters such as latency, total bandwidth, reliability, and other criteria. In step 2230 alternative links are identified for use in the event of link impairment. It should be understood that the links identified in the carrier virtual network in step 2220 and step 2230 may utilize layer one resources dedicated from any dedicating telecommunication network or form the accessing telecommunication network itself. In step 2240 the links are aggregated at the termination point. The termination point may be a customer's premises. Step 2240 may be performed using any suitable aggregator, such as those presently available commercially. In step 2250 the plurality of links are logically aggregated using the carrier virtual network system manager. In performing step 2250 the carrier virtual network system manager may provision each of the plurality of links to establish the connection and manage that connection overall.

Figure 23:
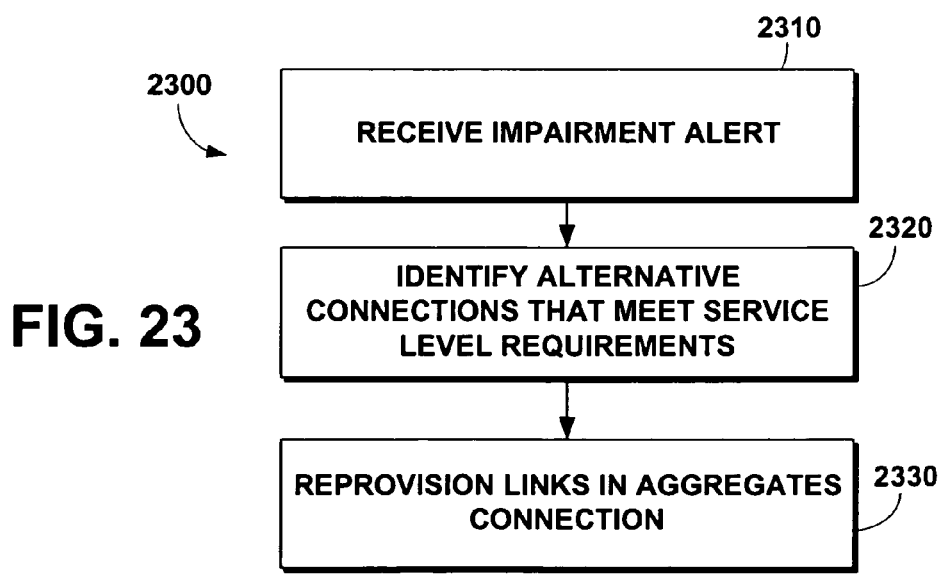
FIG. 23 is a flow diagram of one method for re-provisioning one or more links in an inverse multiplexed connection using layer one resources dedicated to a carrier virtual network.

Referring now to FIG. 23, a method 2300 for re-provisioning one or more links in a carrier virtual network to aggregate a plurality of links into a single high bandwidth connection is illustrated. Method 2300 begins when an impairment alert is received in step 2310. An impairment alert received in step 2310 may be a complete link failure, such as would be due to a fiber cut or equipment failure, or may be a result of link overload or any other event. In step 2320 alternative connections that meet service level requirements are identified. Step 2320 may require exchanging an alternative link for the impaired link. Step 2320 may be more complicated, however, if no one alternative link exists that will fulfill the service level requirements if substituted for the impaired link. In such a case, the impairment of a single link in an aggregated connection may require the re-provisioning of multiple, or even all, links in an aggregate connection. It should be understood that step 2320 may be performed in conjunction with step 2230 of method 2200. Method 2300 concludes with the re-provisioning of the links in the aggregate connection in step 2330.

Carrier virtual network systems in accordance with the present invention may be utilized to dynamically meet the latency requirements of a service level agreement, whether or not links are aggregated into a high bandwidth connection. Latency refers to the delay time associated with transmitting information over a connection. Several factors contribute to the latency of a connection. The physical length of the connection may be one component of a connection's latency. Equipment used to establish a connection, such as switches and routers, also contribute to the latency of the connection. The interfaces along the connection, for example between a portion of layer one resources dedicated to a carrier virtual network and the accessing telecommunication network, can also contribute to the latency of a connection. To determine the total latency of a connection, the component latencies of the connection may be summed. Problematically, latency is often a dynamic quantity. Usage of a telecommunication network may impact the latency of a particular connection. For example, if usage is high, a large amount of traffic may be utilizing the transmission media and equipment of a particular connection, thereby delaying the transmission of information along that connection and increasing the overall latency of the connection. Excessive latency can drastically impair, or entirely defeat, a number of telecommunication applications. Therefore latency requirements are a typical component of service level agreements between a telecommunication service provider and its customers. Meeting the latency requirements is a high priority for a telecommunication service provider.

Figure 24:
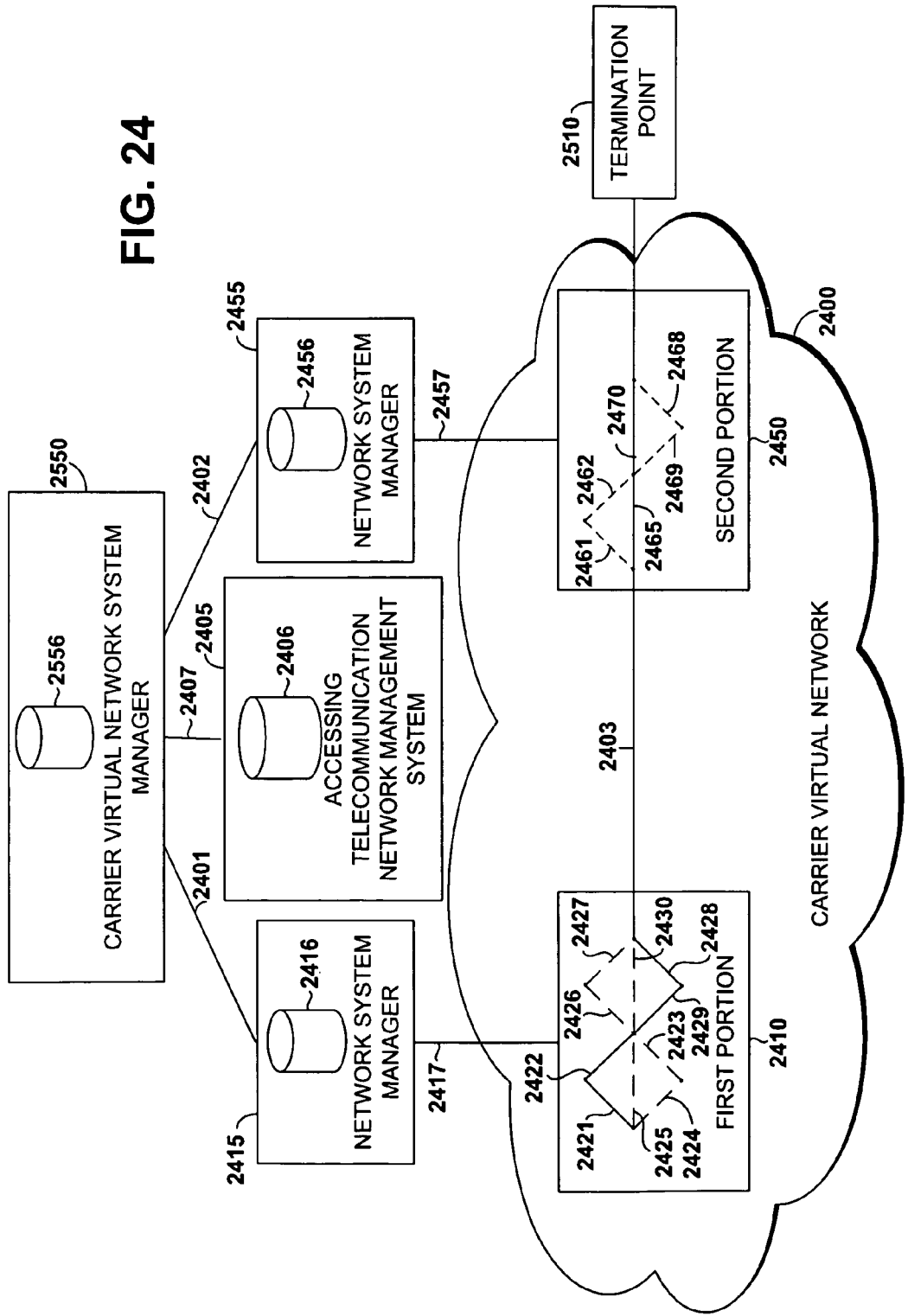
FIG. 24 is a schematic illustration of one embodiment of a carrier virtual network system using dynamic latency re-provisioning.
Figure 25:
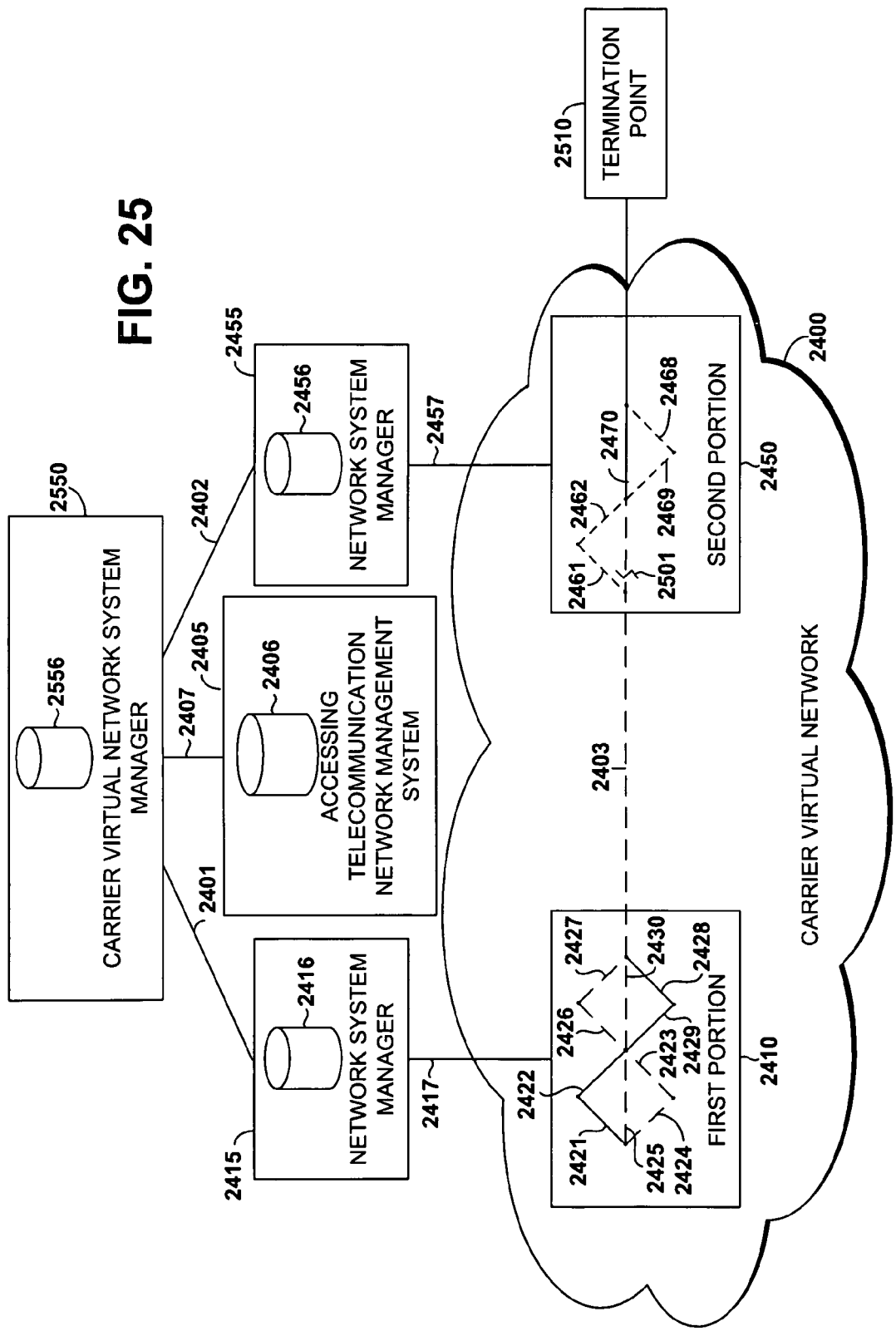
FIG. 25 is a schematic illustration of one embodiment of a carrier virtual network system using dynamic latency re-provisioning.

Referring now to FIG. 24 and FIG. 25, a portion of a carrier virtual network implementing dynamic latency re-provisioning is illustrated. As illustrated in both FIG. 24 and FIG. 25, a carrier virtual network 2400 may comprise at least a first portion of layer one resources 2410 dedicated from one dedicating telecommunication network and may further comprise a second portion 2450 of layer one resources dedicated from a second dedicating telecommunication network. The first portion 2410 and the second portion 2450 may be connected by a network connection 2403. The layer one resources dedicated to the carrier virtual network 2400 in the first portion 2410 may comprise link 2421, link 2422, link 2423, link 2424, link 2425, link 2426, link 2427, link 2428, link 2429, and link 2430. The layer one resources dedicated to the carrier virtual network 2400 in the second portion 2450 may comprise link 2461, link 2462, link 2465, link 2468, link 2469, and link 2470. As illustrated in FIG. 24 and FIG. 25, an accessing telecommunication network may form a connection through the carrier virtual network 2400 to a termination point 2510, which may be a customer location. Often within the telecommunication industry, such a connection must be made within certain parameters, such as total latency.

The first portion 2410 may be directly managed by network system manager 2415 via management connection 2417. Management system 2415 may include a latency database 2416 that maintains dynamic latency information regarding the elements of the dedicating telecommunication network, including the layer one resources included in first portion 2410. Dedicated connection 2401 connects the management system 2415 to the carrier virtual network system manager 2550. A carrier virtual network interface may also be used.

Carrier virtual network system manager 2550 may include a carrier virtual network latency database 2556 that may receive latency information via dedicated connection 2401 from the latency database 2416 of the network management system 2415 regarding the layer one resources in portion 2410 dedicated to the carrier virtual network.

The second portion 2450 of layer one resources dedicated to the carrier virtual network 2400 may be directly managed by network system manager 2455, which may include a dynamic latency database 2456 that maintains dynamic latency information regarding the layer one resources of the dedicating telecommunication network, including the layer one resources included in portion 2450. Dedicated connection 2402 may link network system manager 2455 to carrier virtual network system manager 2550. A carrier virtual network interface may also be used. Carrier virtual network latency database 2556 may receive dynamic latency information from latency database 2456 regarding the layer one resources included in portion 2450 dedicated to the carrier virtual network 2400.

Accessing telecommunication network system manager 2405 may also maintain a latency database 2406. Dedicated connection 2407 may connect accessing telecommunication network management system 2405 to carrier virtual network system manager 2550. Dynamic latency database 2406 may be included in network management system 2405 and may maintain dynamic latency information regarding the available layer one resources of the accessing telecommunication network, as well as dynamic latency information regarding portions of layer one resources dedicated to the carrier virtual network 2400 from dedicating telecommunication networks.

The provisioning of a network connection, such as a connection to termination point 2510, may be performed either by the accessing telecommunication network management system 2405 or the carrier virtual network system manager 2550 to identify and establish an acceptable connection. An acceptable connection may be, for example, the lowest cost connection that meets with the service level requirements of the telecommunication service order. A portion of one such possible connection is illustrated in a solid line in FIG. 24. Such a connection may comprise link 2421, link 2422, link 2429, link 2428, network connection 2403, link 2465, and link 2470. Such a connection may not necessarily be the possible connection with the lowest attainable latency. Rather, the connection may be the lowest cost connection that complies with the operational requirements, such as total latency. For example, using link 2425 and link 2430 in the first portion 2410 of layer one resources may be higher cost but may also have less latency than using link 2421, link 2422, link 2429, and link 2428, but so long as the entire connection meets overall operational requirements, the connection may be acceptable.

However, the connection illustrated in FIG. 24 may not continue to comply with the operating parameters required for an acceptable connection, such as the service level agreement requirements for total latency. For example, as illustrated in FIG. 25, an impairment 2501 may interfere with the operation of one or more links in the connection. As illustrated in FIG. 25, impairment 2501, such as an overload that increases the latency beyond acceptable limits, interferes with the operation of link 2465, thereby rendering the connection illustrated in FIG. 24 unacceptable. Impairment 2501 may also be, for example, an equipment failure or a link cut. In accordance with the present invention, the connection may be reprovisioned using other layer one resources dedicated to the carrier virtual network 2400 as illustrated in FIG. 25. As illustrated in FIG. 25, the connection has been reprovisioned to utilize link 2425, link 2430, network connection 2403, link 2461, link 2462, and link 2470. Re-provisioning the connection around impairment 2501, for example by diverting the connection off of link 2465 to the combination of links 2461 and link 2462, may increase the latency of the total connection if other adjustments to lower latency are not made. As illustrated in FIG. 25, the routing of connection for the first portion 2410 has been changed to reduce latency, using link 2425 and link 2430 rather than link 2421, link 2422, link 2429 and link 2428.

It should be noted that the provisioning and re-provisioning of a connection to dynamically comply with operational requirements such as latency will often be considerably more complex than illustrated in FIG. 24 and FIG. 25. For example, layer one resources available to the accessing telecommunication network may be included in the connection before re-provisioning, after re-provisioning, or both. Furthermore, layer one resources from additional dedicating telecommunication networks beyond the two illustrated in FIG. 24 and FIG. 25 may be employed. However, FIG. 24 and FIG. 25 illustrate one example of the use of the present invention to dynamically re-provisioning connections using a carrier virtual network to comply with the latency requirements of a service level agreement.

In accordance with the present invention, the dynamic latency databases may include information regarding the latency of the links in the first portion 2410, the second portion 2450, the network connection 2403, and any other layer one resources included in the connection to termination point 2510. These latencies are then summed in attempting to identify a connection to provision and, if that total latency sum is below the maximum allowed in the service level agreement, the connection may be made. If multiple connections may be made that comply with the service level agreement latency requirements, the connection may be selected based on other criteria, such as being the lowest cost to provide. The cost of a connection may be determined in a variety of ways, such as using weights assigned to the component of the connection by network engineers. When an impairment of any type occurs that causes a connection to exceed the latency requirements of a service level agreement, the connection may be dynamically reprovisioned to identify another connection that complies with those latency requirements. If more than one connection complies with the latency requirements, the selection from among the possible connections may be made based upon other criteria, such as the one that may be made at the lowest cost. The process of provisioning and dynamically re-provisioning a connection may be performed either at the carrier virtual network system manager 2550 using the carrier virtual network latency database 2556 or by the accessing telecommunication network management system 2405 using latency database 2406 if latency information for the layer one resources dedicated to the carrier virtual network is included in database 2406.

Figure 26:
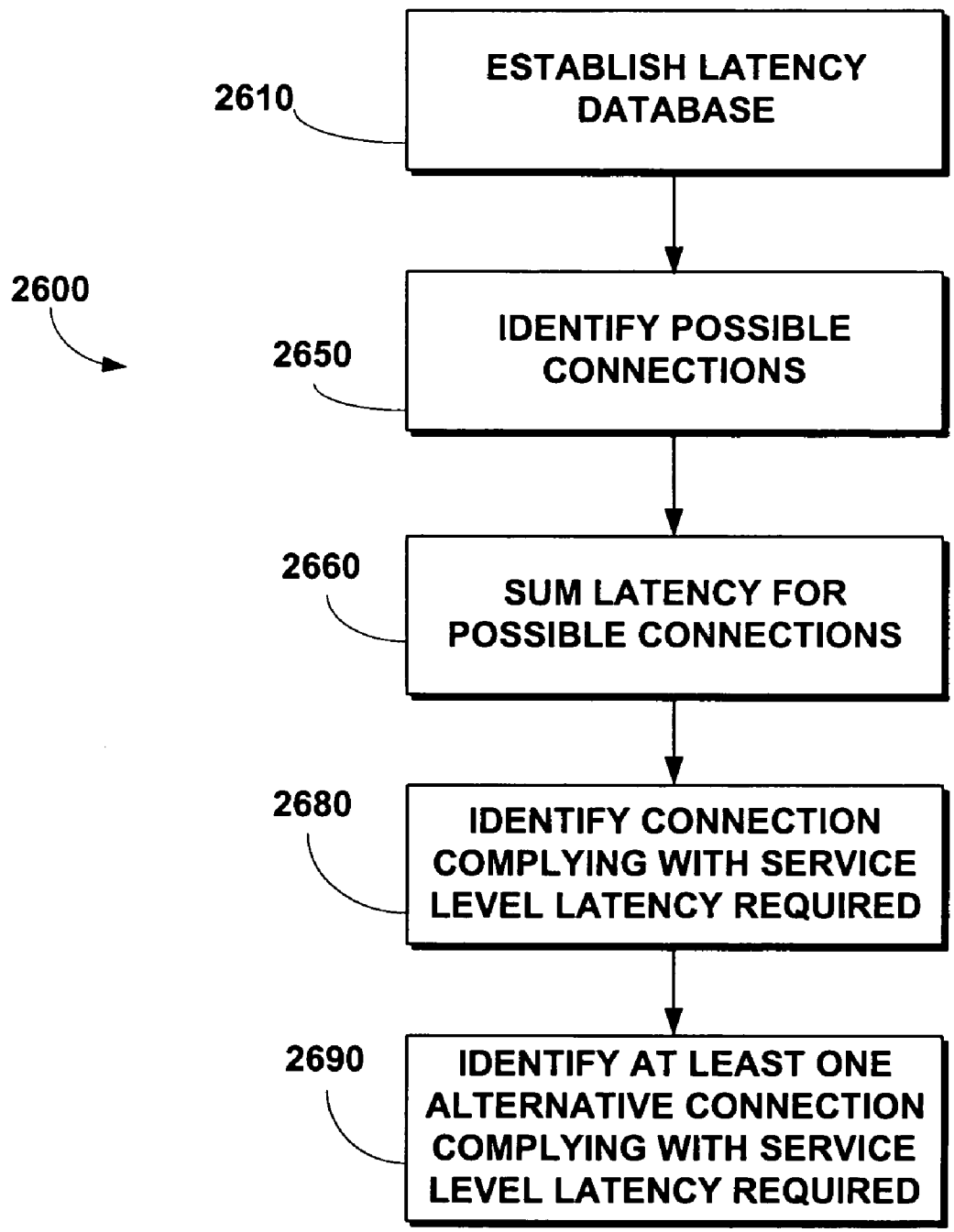
FIG. 26 is a flow diagram of one method for dynamic latency re-provisioning.

Referring now to FIG. 26, a method 2600 in accordance with the present invention for dynamically provisioning and re-provisioning connections over a carrier virtual network to comply with the latency requirements of a service level agreement is illustrated. In step 2610 a latency database is established. The latency database established in step 2610 may be a database maintained on the carrier virtual network system manager, may be a database maintained on the management system of the accessing telecommunication network, both, or may be a database maintained at another location. The latency database established in step 2610 may include latency information for the layer one resources dedicated to the carrier virtual network from all dedicating telecommunication networks, latency information for the layer one resources available from the accessing telecommunication network itself, latency information for any network connections in the carrier virtual network. The latency database established in step 2610 may receive latency information from the management systems of the dedicating telecommunication networks. When a connection needs to be made in response to a telecommunication service order, possible connections are identified in step 2650. The connections identified in step 2650 may be connections that would establish the connection required by the service order, without regard to whether those connections would comply with other requirements of the service level agreement, such as total latency limits. In step 2660 the latency for the identified possible connections are determined, for example, by summing each connection's component latencies. Step 2660 effectively identifies the possible connections that also meet the latency requirements of the service level agreement. In step 2680, a connection is identified that complies with the service level latency requirements. The connection identified in step 2680 may be provisioned. In selecting one connection from possibly a large plurality that comply with the latency requirements of the service level agreement, any criteria may be used. In many situations, the lowest cost connection may be selected from the plurality. In step 2690, at least one alternative connection complying with the service level latency requirements is identified. Step 2690 may be performed in conjunction with one or more preceding steps, or may occur after an impairment arises on one or more links in a connection. If an impairment occurs, the connection may be dynamically reprovisioned to one of the at least one alternative connection identified in step 2690.

Figure 27:
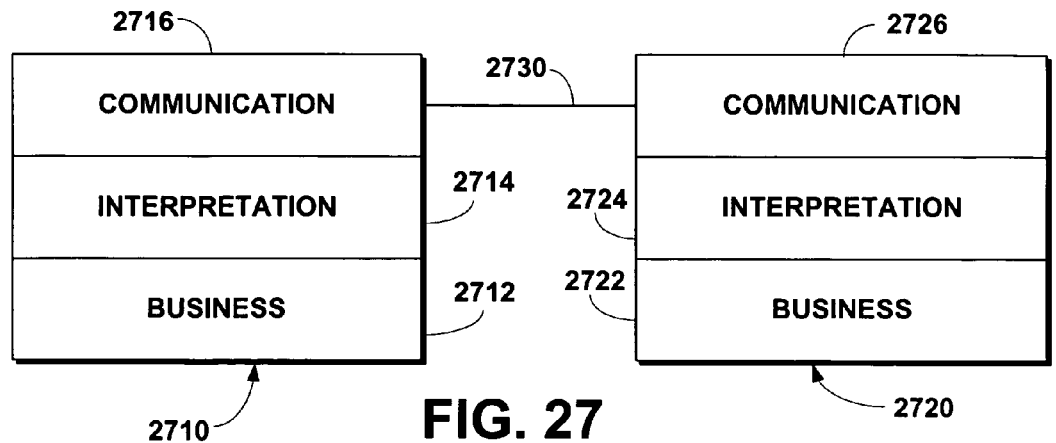
FIG. 27 is a schematic illustration of one embodiment of an interface system for a carrier virtual network.

In establishing carrier virtual networks in accordance with the present invention, it may be necessary to allow the management systems of accessing and dedicating telecommunication networks to communicate network information and to receive and send network instructions for the layer one resources dedicated to a carrier virtual network. FIG. 27 illustrates one possible communication configuration for use with carrier virtual networks in accordance with the present invention. As illustrated in FIG. 27, both a dedicating telecommunication network 2710 and an accessing telecommunication network 2720 include multiple communication layers. The three communication layers implemented may be a business layer, an interpretation layer, and a communication layer.

In the dedicating telecommunication network 2710, the business layer 2712 transmits information and commands between the network management system of the dedicating network and the layer one resources of the dedicating network. The format of network information and instructions transmitted in the business layer 2712 is immaterial to the present invention, and can be any format.

Likewise, the accessing telecommunication network 2720 includes a business layer 2722 that transmits network information and network instructions from the management system of the accessing telecommunication network to the layer one resources of the accessing telecommunication network. The format used for network information and network instructions in the business layer 2722 of the accessing telecommunication network 2720 is immaterial to the present invention. While the format used in the business layer 2712 of the dedicating telecommunication network 2712 and the business layer 2722 of the accessing telecommunication network 2720 may be the same, the formats may also be entirely different and incompatible.

An interpretation layer 2714 interfaces with the business layer 2712 of the dedicating telecommunication network 2710. The interpretation layer 2714 converts the network information received from layer one resources of the dedicating telecommunication network 2710 that are dedicated to a carrier virtual network to messages having a predetermined format. The messages having a predetermined format are then passed to communication layer 2716. Messages having a predetermined format may further be received from communication layer 2726 of the accessing telecommunication network 2720. These messages received from the accessing telecommunication network 2720 may comprise network instructions from the accessing telecommunication network system manager for the layer one resources dedicated to the carrier virtual network from the dedicating telecommunication network 2710. Such a message is received via dedicated connection 2730 by the communication layer 2716 of the dedicating telecommunication network 2710. Messages received by communication layer 2716 are then passed to interpretation layer 2714 for conversion from the predetermined format to network instructions having a format suitable for transmission by business layer 2712. Network information regarding the layer one resources dedicated to the carrier virtual network from dedicating telecommunication network 2710 may be transmitted from communication layer 2716 via the dedicated connection 2730 to communication layer 2726 of the accessing telecommunication network 2720. These messages may then be passed from communication layer 2726 to interpretation layer 2724. Interpretation layer 2724 may then convert these messages from a predetermined format to a format suitable for transmission in business layer 2722 to the network management system of the accessing telecommunication network 2720. In this fashion, network information regarding the layer one resources dedicated to the carrier virtual network from the dedicating telecommunication network 2710 may be transmitted to the network management system of the accessing network 2720 and arrive in a format suitable for processing by the accessing network 2720 network management system. Likewise, network instructions from the network management system of the accessing telecommunication network 2720 may be transmitted to the layer one resources dedicated to the carrier virtual network from the dedicated telecommunication 2710 via the business layer 2712 of the dedicated telecommunication network 2710 in a suitable format. The communication layer 2716 may use any suitable protocol to transmit messages. Suitable protocols include, but are not limited to, CORBA, JMS, and Telnet protocols.

Figure 28:
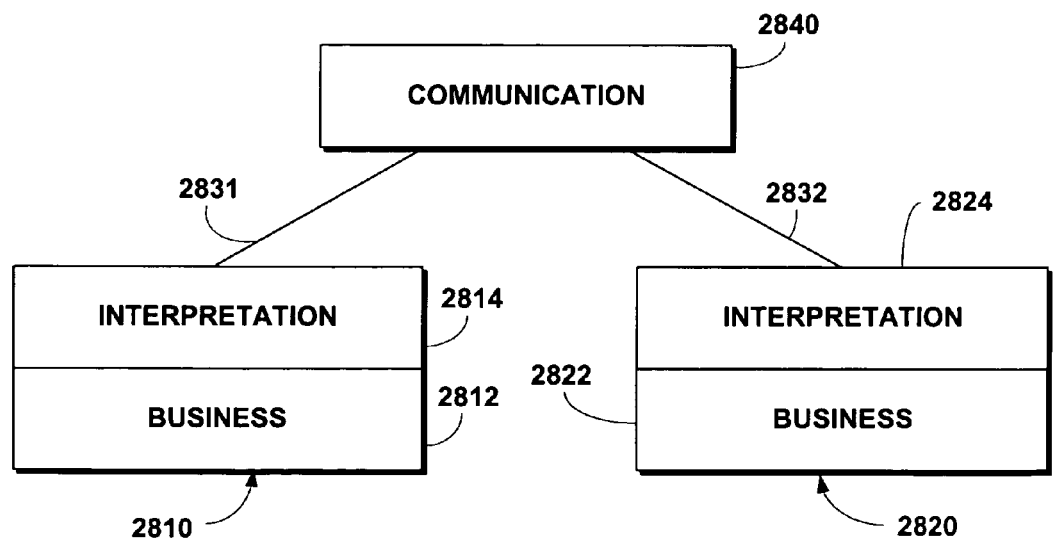
FIG. 28 is a schematic illustration of one embodiment of an interface system for a carrier virtual network.

Referring now to FIG. 28, an alternative configuration of communication layers pursuant to the present invention is illustrated. A single communication layer 2840 interfaces with the interpretation layer 2814 of the dedicated telecommunication network 2810 via dedicated connection 2831. Communication layer 2840 further interfaces with the interpretation layer 2824 of the accessing telecommunication network 2820 via dedicated connection 2832. Communication layer 2840 may be, for example, part or all of a carrier virtual network system manager. Interpretation layer 2814 interfaces with the business layer 2812 of the dedicating telecommunication network. Interpretation layer 2814 may be, for example, a carrier virtual network interface, such as described above to facilitate the exchange of information between a carrier virtual network system manager and a telecommunication network management system. Likewise, interpretation layer 2824 interfaces with business layer 2822 of accessing telecommunication network 2820. Interpretation layer 2824 may, for example, comprise a carrier virtual network interface, such as described above to facilitate the exchange of information between a carrier virtual network system manager and a telecommunication network management system.

Figure 29:
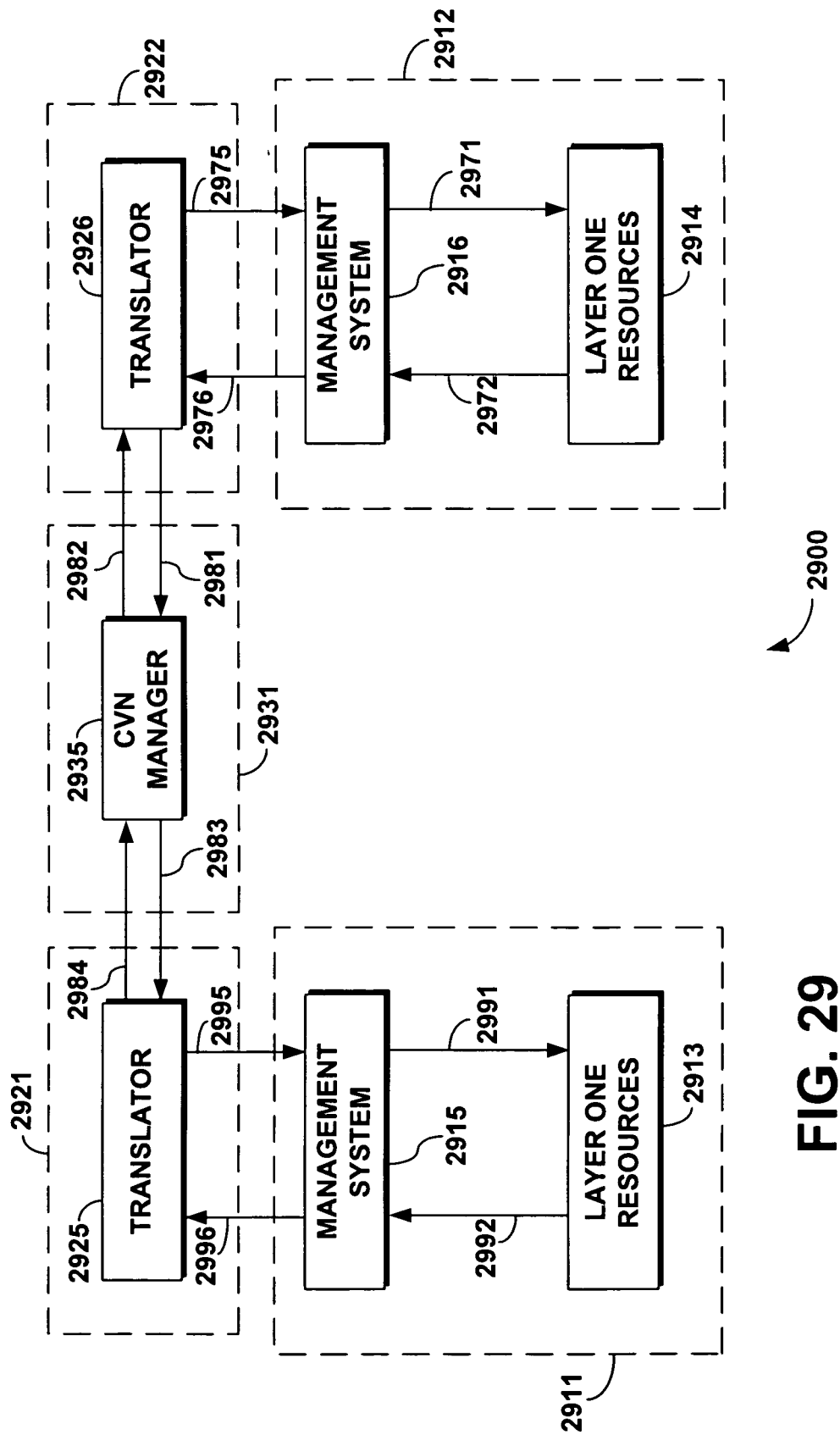
FIG. 29 is a schematic illustration of data flow in one embodiment of an interface system for a carrier virtual network.

Referring now to FIG. 29, an example of possible information flow between business, interpretation, and communication layers in accordance with the present invention is illustrated. Dedicating network business layer 2911 may comprise layer one resources dedicated to the carrier virtual network 2913 and dedicating network management system 2915. Network information 2992 may be passed from the layer one resources 2913 to management system 2915. Network information 2992 may be in a first format. Business layer 2911 interfaces with interpretation layer 2921. Interpretation layer 2921 may comprise a carrier virtual network interface. Interpretation layer 2921 includes a translator 2925 that converts network information 2996 from its first format to a predetermined format. The predetermined format may be, for example an XML or ASCII text message. The messages having a predetermined format 2984 carrying network information are then transmitted to communication layer 2931. Communication layer 2931 may comprise a carrier virtual network system manager 2935, although it should be noted that more than one carrier virtual network system manager may be used in accordance with the present invention. The network information messages may then be forwarded 2982 to the interpretation layer 2922 of the accessing telecommunication network. Translator 2926 may convert network information messages 2982 to network information 2975 having a second format. The second format may be any format useable by the accessing telecommunication network management system.

This network information having a second format is passed to business layer 2912 of the accessing telecommunication network. More specifically, network information 2975 is input into accessing telecommunication network management system 2916. Accessing telecommunication network management system 2916 directly manages layer one resources 2914 available in the accessing telecommunication network by transmitting network instructions 2971 in the second format to layer one resources 2914 and receiving network information 2972 in the second format from the layer one resources. Accessing telecommunication network management system 2916 indirectly manages the layer one resources 2913 dedicated to the carrier virtual network from the dedicating telecommunication network by receiving the network information in the second format 2975 from translation layer 2922. Accessing telecommunication network management system 2916 may then issue network instructions 2976 in the second format. The network instructions 2976 pass to interpretation layer 2922, and translator 2926 converts network instructions 2976 from the second format to a predetermined format, such as XML or ASCII text, for transmission as network instruction messages 2981 to communication layer 2931. Communication layer 2931, passes network instruction messages 2983 ultimately originating from accessing telecommunication network management system 2916 to interpretation layer 2921 of the dedicating telecommunication network. Interpretation layer 2921 and translator 2925 converts the network instruction messages 2983 from the predetermined format to network instructions 2995 having the first format. Network instructions 2995 are passed to the management system 2915 of the dedicating the telecommunication network. The first format may be any format useable by the dedicating telecommunication network management system. Network instructions 2995 are then passed by management system 2915 as network instructions 2991 having the first format to layer one resources 2913 dedicated to the carrier virtual network. In this fashion, accessing telecommunication network management system 2916 may directly manage layer one resources 2914 available to it in the accessing telecommunication network and may indirectly manage the layer one resources 2913 dedicated to the carrier virtual network.

It should be appreciated that the above sets forth illustrative examples of carrier virtual networks, carrier virtual network system managers, and methods of establishing a carrier virtual network, but that the invention is not limited to any of the specific embodiments described above. The present invention is not limited to any particular type of layer one telecommunication resource, nor is it limited to any given network system manager protocol or type. Many aspects of the present invention may be implemented using computer software embodied on computer readable media to be executed by a computer or other machine. The use of such computer software may be particularly useful as part of a carrier virtual network system manager. The present invention is not limited to the use of any particular programming language, nor is it limited to the use of any particular computer or other machine to execute the machine readable code. These and other variations will be apparent to one of ordinary skill in the art.

The invention claimed is:

1. A carrier virtual network inverse multiplexed system comprising:
   a first telecommunication network, the first telecommunication network having a plurality of layer one resources;
   a second telecommunication network, the second telecommunication network having a plurality of layer one resources;
   a portion of the layer one resources of the second telecommunication network dedicated to a first carrier virtual network;
   a first network connection linking the first telecommunication network to the portion of the layer one resources of the second telecommunication network dedicated to the first carrier virtual network; and
   an aggregate link that establishes a telecommunication connection to a termination point, the aggregate link comprising:
      a first link from the first carrier virtual network;
      a second link from the first carrier virtual network;
      a carrier virtual network manager that aggregates the first link and the second link; and
      an aggregator that aggregates the termination of the first link and the second link at their termination.

2. The carrier virtual network inverse multiplexed system of claim 1, further comprising:
   a third telecommunication network, the third telecommunication network having a plurality of layer one resources;
   a portion of the layer one resources of the third telecommunication network dedicated to the first carrier virtual network; and
   a second network connection linking the first telecommunication network to the portion of the layer one resources of the third telecommunication network dedicated to the first carrier virtual network.

3. The carrier virtual network inverse multiplexed system of claim 2, wherein:
   the first link from the carrier virtual network comprises a link from the portion of the layer one resources of the second telecommunication network dedicated to the first carrier virtual network; and
   the second link from the carrier virtual network comprises a link from the portion of the layer one resources of the third telecommunication network dedicated to the first carrier virtual network.

4. The carrier virtual network inverse multiplexed system of claim 1, wherein the aggregate link further comprises:
   at least one alternative link from the first carrier virtual network, the alternative link to be used in the aggregate link if the carrier virtual network manager determines that a link in the aggregate link is impaired.

5. The carrier virtual network inverse multiplexed system of claim 3, further comprising:
   at least one alternative link from the first carrier virtual network, the alternative link to be used in the aggregate link if the carrier virtual network manager determines that a link in the aggregate link is impaired.

6. The carrier virtual network inverse multiplexed system of claim 2, further comprising:
   a fourth telecommunication network, the fourth telecommunication network having a plurality of layer one resources;
   a portion of the layer one resources of the fourth telecommunication network dedicated to a second carrier virtual network; and
   a third network connection linking the first telecommunication network to the portion of the layer one resources of the fourth telecommunication network dedicated to the second carrier virtual network; and
   wherein: the aggregate link further comprises:
      a third link from the second carrier network;
      a carrier virtual network manager that aggregates the first link, the second link, and the third link; and
      an aggregator that aggregates the termination of the first link, the second link, and the third link.

7. A carrier virtual network inverse multiplexed system comprising:
   a first telecommunication network;
   a first carrier virtual network, the first carrier virtual network comprising at least one portion of layer one resources of at least one additional telecommunication network, the layer one resources of the first carrier virtual network being accessible to the first telecommunication network;
   at least one network connection linking the first telecommunication network to the at least one portion of layer one resources of the at least one additional telecommunication network;
   a plurality of links from the first carrier virtual network;
   a carrier virtual network manager that aggregates the plurality of links from the first carrier virtual network; and
   an aggregator to aggregate the termination of the plurality of links from the first carrier virtual network.

8. The carrier virtual network inverse multiplexed system of claim 7, further comprising:
   a plurality of alternative links from the first carrier virtual network, at least one of the plurality alternative links to be aggregated by the carrier virtual network manager if one of the plurality of links becomes impaired.

9. The carrier virtual network inverse multiplexed system of claim 7, wherein the plurality of links comprise different media.

10. The carrier virtual network inverse multiplexed system of claim 7, wherein at least one of the plurality of links comprises an E1 copper link.

11. The carrier virtual network inverse multiplexed system of claim 10, wherein at least one of the plurality of links further comprises a wireless link.

12. The carrier virtual network inverse multiplexed system of claim 10, wherein the plurality of links further comprises a coaxial link.

13. The carrier virtual network inverse multiplexed system of claim 10, wherein at least one of the plurality of links further comprises an FSO link.

14. The carrier virtual network inverse multiplexed system of claim 7, further comprising:
at least one high bandwidth connection output from the aggregator.

15. A method for establishing a carrier virtual network inverse multiplexed system to meet service level requirements, the method comprising:
establishing a first carrier virtual network that may be accessed by a first telecommunication network, establishing the first carrier virtual network comprising:
dedicating at least one portion of the layer one resources of at least one telecommunication network to the first carrier virtual network;
establishing a carrier virtual network manager to manage the at least one portion of the layer one resources dedicated to the carrier virtual network;
identifying the at least one portion of the layer one resources dedicated to the carrier virtual network to the carrier virtual network manager; and
accessing at least two layer one resources of the at least one portion of the layer one resources dedicated to the first carrier virtual network by at least one telecommunication network;
identifying a plurality of links in the first carrier virtual network that combine to meet service level requirements;
provisioning the plurality of links;
aggregating the identified plurality of links using the carrier virtual network manager; and
aggregating the identified links at their termination.

16. The method for establishing a carrier virtual network inverse multiplexed system of claim 15, the method further comprising:
identifying a plurality of alternative links for use if any of the identified links become impaired; and
aggregating at least one of the alternative links at the termination and the carrier virtual network manager if any of the identified links become impaired so that the aggregated links continue to meet the service level requirements.

17. The method for establishing a carrier virtual network inverse multiplexed system of claim 16, wherein aggregating at least one of the alternative links at the termination and the carrier virtual network manager if any of the identified links become impaired comprises:
receiving an impairment alert at the carrier virtual network manager identifying the impairment of one of the aggregated links;
provisioning at least one alternative link to replace the impaired link;
re-aggregating the at least one alternative link with the non-impaired identified links at the termination; and
re-aggregating the at least one alternative link with the non-impaired identified links using the carrier virtual network manager.

18. The method for establishing a carrier virtual network inverse multiplexed system of claim 15, further comprising:
identifying a plurality of alternative links for use if any of the identified links become impaired;
receiving an impairment alert at the carrier virtual network manager identifying the impairment of one of the aggregated links;
provisioning at least one alternative link to replace the impaired link;
re-aggregating the at least one alternative link with the non-impaired identified links at the termination; and
re-aggregating the at least one alternative link with the non-impaired identified links using the carrier virtual network manager.

19. The method for establishing a carrier virtual network inverse multiplexed system of claim 15, further comprising:
receiving an impairment alert at the carrier virtual network manager identifying the impairment of one of the aggregated links;
identifying a second plurality of links in the first carrier network that combine to meet service level requirements, the second plurality of links not containing the impaired link;
provisioning the second plurality of links;
aggregating the second plurality of links using the carrier virtual network manager; and
aggregating the second plurality of links at the termination.

20. The method for establishing a carrier virtual network inverse multiplexed system of claim 19 wherein identifying a second plurality of links occurs before receiving an impairment alert.

21. The method for establishing a carrier virtual network inverse multiplexed system of claim 19 wherein identifying a second plurality of links occurs after receiving an impairment alert.

22. A method for establishing an inverse multiplexed connection to meet service level requirements using a plurality of links dedicated to at least one carrier virtual network accessible to an accessing telecommunication network, the method comprising:
identifying a first plurality of links dedicated to a carrier virtual network accessible to the accessing telecommunication network that combine to meet service level requirements;
provisioning the first plurality of links;
identifying a second plurality of links dedicated to a carrier virtual network accessible to the accessing telecommunication network that combine to meet service level requirements;
aggregating the first plurality of links at their termination;
aggregating the first plurality of links using a carrier virtual network manager; and
if one of the first plurality of links becomes impaired:
provisioning the second plurality of links;
aggregating the second plurality of links at their termination; and
aggregating the second plurality of links using a carrier virtual network manager.

23. The method for establishing an inverse multiplexed system of claim 22, wherein identifying a second plurality of links occurs only if one of the first plurality of links becomes impaired.

24. The method for establishing an inverse multiplexed system of claim 23, wherein the second plurality of links comprises the non-impaired links of the first plurality of links and at least one additional link.

25. At least one machine readable media containing machine readable code embodied thereon for causing a machine to perform a method for establishing a carrier virtual network inverse multiplexed connection to meet service level requirements, the method comprising:
establishing a first carrier virtual network that may be accessed by a first telecommunication network, establishing the first carrier virtual network comprising:

dedicating at least one portion of the layer one resources of at least one telecommunication network to the first carrier virtual network;

establishing a carrier virtual network manager to manage the at least one portion of the layer one resources dedicated to the carrier virtual network;

identifying the at least one portion of the layer one resources dedicated to the carrier virtual network to the carrier virtual network manager; and accessing at least two layer one resources of the at least one portion of the layer one resources dedicated to the first carrier virtual network by at least one telecommunication network;

identifying a plurality of links in the first carrier virtual network that combine to meet service level requirements;

provisioning the plurality of links;

aggregating the identified plurality of links using the carrier virtual network manager; and aggregating the identified links at their termination.

26. The at least one machine readable media of claim 25, the method further comprising:

identifying a plurality of alternative links for use if any of the identified links become impaired; and aggregating at least one of the alternative links at the termination and the carrier virtual network manager if any of the identified links become impaired so that the aggregated links continue to meet the service level requirements.

27. The at least one machine readable media of claim 26, the method further comprising:

receiving an impairment alert at the carrier virtual network manager identifying the impairment of one of the aggregated links;

provisioning at least one alternative link to replace the impaired link;

re-aggregating the at least one alternative link with the non-impaired identified links at the termination; and re-aggregating the at least one alternative link with the non-impaired identified links using the carrier virtual network manager.

28. The at least one machine readable media of claim 25, the method further comprising:

identifying a plurality of alternative links for use if any of the identified links become impaired;

receiving an impairment alert at the carrier virtual network manager identifying the impairment of one of the aggregated links;

provisioning at least one alternative link to replace the impaired link;

re-aggregating the at least one alternative link with the non-impaired identified links at the termination; and re-aggregating the at least one alternative link with the non-impaired identified links using the carrier virtual network manager.

29. The at least one machine readable media of claim 25, the method further comprising:

receiving an impairment alert at the carrier virtual network manager identifying the impairment of one of the aggregated links;

identifying a second plurality of links in the first carrier network that combine to meet service level requirements, the second plurality of links not containing the impaired link;

provisioning the second plurality of links;

aggregating the second plurality of links using the carrier virtual network manager; and aggregating the second plurality of links at the termination.

30. The at least one machine readable media of claim 29, the method further comprising identifying a second plurality of links before receiving an impairment alert.

31. The at least one machine readable media of claim 29, the method further comprising identifying a second plurality of links after receiving an impairment alert.

32. At least one machine readable media containing machine readable code embodied thereon for causing a machine to perform a method for establishing an inverse multiplexed connection to meet service level requirements using a plurality of links dedicated to at least one carrier virtual network accessible to an accessing telecommunication network, the method comprising:

identifying a first plurality of links dedicated to a carrier virtual network accessible to the accessing telecommunication network that combine to meet service level requirements;

provisioning the first plurality of links;

identifying a second plurality of links dedicated to a carrier virtual network accessible to the accessing telecommunication network that combine to meet service level requirements;

aggregating the first plurality of links at their termination;

aggregating the first plurality of links using a carrier virtual network manager; and if one of the first plurality of links becomes impaired:
provisioning the second plurality of links;
aggregating the second plurality of links at their termination; and
aggregating the second plurality of links using a carrier virtual network manager.

33. The at least one machine readable media of claim 32, the method further comprising identifying a second plurality of links only if one of the first plurality of links becomes impaired.

34. The at least one machine readable media of claim 33, wherein the second plurality of links comprises the non-impaired links of the first plurality of links and at least one additional link.

* * * * *